US011178693B2

(12) United States Patent
Zhang et al.

(10) Patent No.: US 11,178,693 B2
(45) Date of Patent: Nov. 16, 2021

(54) V2X SIDE-LINK RESOURCE MANAGEMENT

(71) Applicant: Apple Inc., Cupertino, CA (US)

(72) Inventors: Wanping Zhang, San Jose, CA (US); Wei Zhang, Santa Clara, CA (US); Dawei Zhang, Saratoga, CA (US); Faraz Faheem, Santa Clara, CA (US); Haijing Hu, Beijing (CN); Haitong Sun, Irvine, CA (US); Ping Wang, San Jose, CA (US); Sachin J. Sane, Santa Clara, CA (US); Sami M. Almalfouh, San Jose, CA (US); Tianyan Pu, Cupertino, CA (US); Wei Zeng, San Diego, CA (US); Yuqin Chen, Shenzhen (CN); Pengkai Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/583,793

(22) Filed: Sep. 26, 2019

(65) Prior Publication Data
US 2020/0196353 A1  Jun. 18, 2020

Related U.S. Application Data

(60) Provisional application No. 62/779,820, filed on Dec. 14, 2018.

(51) Int. Cl.
*H04W 74/08* (2009.01)
*H04W 74/00* (2009.01)
(Continued)

(52) U.S. Cl.
CPC ....... *H04W 74/0816* (2013.01); *H04W 4/023* (2013.01); *H04W 72/0446* (2013.01);
(Continued)

(58) Field of Classification Search
CPC ............. H04W 4/023; H04W 12/0802; H04W 28/0284; H04W 36/023; H04W 4/026; H04W 4/06
See application file for complete search history.

(56) References Cited

U.S. PATENT DOCUMENTS 9,961,685 B2   5/2018  Sorrentino
10,206,215 B2  2/2019  Kim
(Continued)

FOREIGN PATENT DOCUMENTS

KR    2017110069 A     10/2017
WO    WO 2017/176097 A1  10/2017

OTHER PUBLICATIONS

N. Bonjorn, F. Foukalas and P. Pop, "Enhanced 5G V2X services using sidelink device-to-device communications," 2018 17th Annual Mediterranean Ad Hoc Networking Workshop (Med-Hoc-Net), Capri, Jun. 20-22, 2018, pp. 1-7, doi: 10.23919/MedHocNet.2018.8407085.*
(Continued)

*Primary Examiner* — Chandrahas B Patel
(74) *Attorney, Agent, or Firm* — Kowert, Hood, Munyon, Rankin & Goetzel P.C.

(57) ABSTRACT

Apparatuses, systems, and methods for a wireless device to perform methods to implement mechanisms for performing autonomous and non-autonomous side-link resource management as well as groupcast side-link resource management. A wireless device may perform a method for autonomous (e.g., non-network assisted) side-link resource management, e.g., the wireless device may perform a method to originate a semi-persistent side-link schedule for a side-link resource (e.g., a time domain and/or a frequency domain resource for side-link communications). Additionally, a wireless device may perform a method for groupcast side-link resource management. A network node may per-
(Continued)

form a method for non-autonomous (e.g., network assisted) side-link resource management, e.g., the network node may perform a method to assist wireless devices to schedule side-link resources.

20 Claims, 19 Drawing Sheets

(51) Int. Cl.
  *H04W 72/04* (2009.01)
  *H04W 4/02* (2018.01)
  *H04W 4/40* (2018.01)
(52) U.S. Cl.
  CPC ..... *H04W 72/0453* (2013.01); *H04W 74/004* (2013.01); *H04W 4/40* (2018.02)

(56) References Cited

U.S. PATENT DOCUMENTS

| | | |
|---|---|---|
| 2016/0095092 A1 | 3/2016 | Khoryaev |
| 2018/0042037 A1 | 2/2018 | Jin |
| 2018/0317221 A1 | 11/2018 | Yasukawa |
| 2018/0332585 A1 | 11/2018 | Faurie |
| 2019/0116586 A1 | 4/2019 | Basu Mallick |

OTHER PUBLICATIONS

Sony; "Location based resource selection on LTE sidelink for V2V services"; R1-160678; 3GPP TSG RAN WG1 Meeting #84; St Julian's, Malta; Feb. 15-19, 2016; three pages.

* cited by examiner

V2X SIDE-LINK RESOURCE MANAGEMENT

PRIORITY DATA

This application claims benefit of priority to U.S. Provisional Application Ser. No. 62/779,820, titled "V2X Side-link Resource Management", filed Dec. 14, 2018, which is hereby incorporated by reference in its entirety as though fully and completely set forth herein.

FIELD

The present application relates to wireless devices, and more particularly to apparatus, systems, and methods for a wireless device to perform a variety of cellular communication techniques.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to perform various cellular communication techniques, including improvements to side-link communications in V2X (vehicle to everything) networks.

The techniques described herein may be implemented in and/or used with a number of different types of devices, including but not limited to cellular phones, tablet computers, wearable computing devices, portable media players, and any of various other computing devices.

In some embodiments, a wireless device may perform a method for autonomous (e.g., non-network assisted) side-link resource management, e.g., the wireless device may perform a method to originate a semi-persistent side-link schedule for a resource. In some embodiments, the method may include determining status of the wireless device within a set of wireless devices (e.g., neighboring devices within range for side-link communications) and listening, based on the determined status, for resource occupancy messages broadcast within the set of wireless devices for a first time period. Further, the method may include determining, based, at least in part, on resource occupancy messages received during the first time period, available transmission resources within the set of wireless devices, including an associated duration of the available transmission resources and broadcasting a first resource occupancy message announcing a reservation of available transmission resources for the associated duration. In some embodiments, the first resource occupancy message may include a schedule of resource blocks the wireless device will transmit in, a periodicity of resource occupancy, and a time remaining for the resource occupancy.

In some embodiments, a network node may perform a method for non-autonomous (e.g., network assisted) side-link resource management, e.g., the network node may perform a method to assist wireless devices to schedule side-link resources. In some embodiments, the method may include determining location information for a plurality of sets of user equipment devices (UEs) served by the network node and assigning side-link time and frequency domain resources to the plurality of sets of UEs. In some embodiments, the location information may include one or more of mobility of UEs within the plurality of sets of UEs and/or relative distance between the plurality of sets of UEs. In some embodiments, assignments may be based, at least in part, on the location information. In some embodiments, assigning may include assignment of first side-link time and frequency domain resources to two or more sets of UEs within the plurality of sets of UEs where the two or more sets of UEs are not within side-link proximity of one another. In some embodiments, the assigning may include assignment of differing side-link time and frequency domain resources to two or more sets of UEs within the plurality of sets of UEs where the two or more sets of UEs are within side-link proximity of one another. In some embodiments, assigning may include assignment of second side-link time and frequency domain resources to a set of UEs within the plurality of sets of UEs where UEs within the set of UEs reuse a side-link time and frequency domain resource via beamforming.

In some embodiments, a wireless device may perform a method for groupcast side-link resource management. In some embodiments, the method may include determining that a pre-defined side-link resource is scheduled for the wireless device and in response to determining that the wireless device does not have data to transmit during the pre-defined side-link resource, marking the pre-defined side-link resource as donated to a neighboring wireless device. In some embodiments, the wireless device and neighboring wireless device may be included in a group of wireless devices participating in a side-link groupcast. In some embodiments, the method may also include transmitting data during the pre-defined side-link resource in response to determining that the wireless device does have data to transmit during the pre-defined side-link resource. In such embodiments, if the wireless device has addition data to transmit at the end of the pre-defined side-link resource, the method may include marking a buffer status report to indicate the additional data to neighboring wireless devices in the group of wireless devices participating in the side-link groupcast. In some embodiments, the method may further include receiving, from at least one neighboring wireless device, a donation of pre-defined side-link resources and transmitting the additional data during the donated pre-defined side-link resources.

This Summary is intended to provide a brief overview of some of the subject matter described in this document.

Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
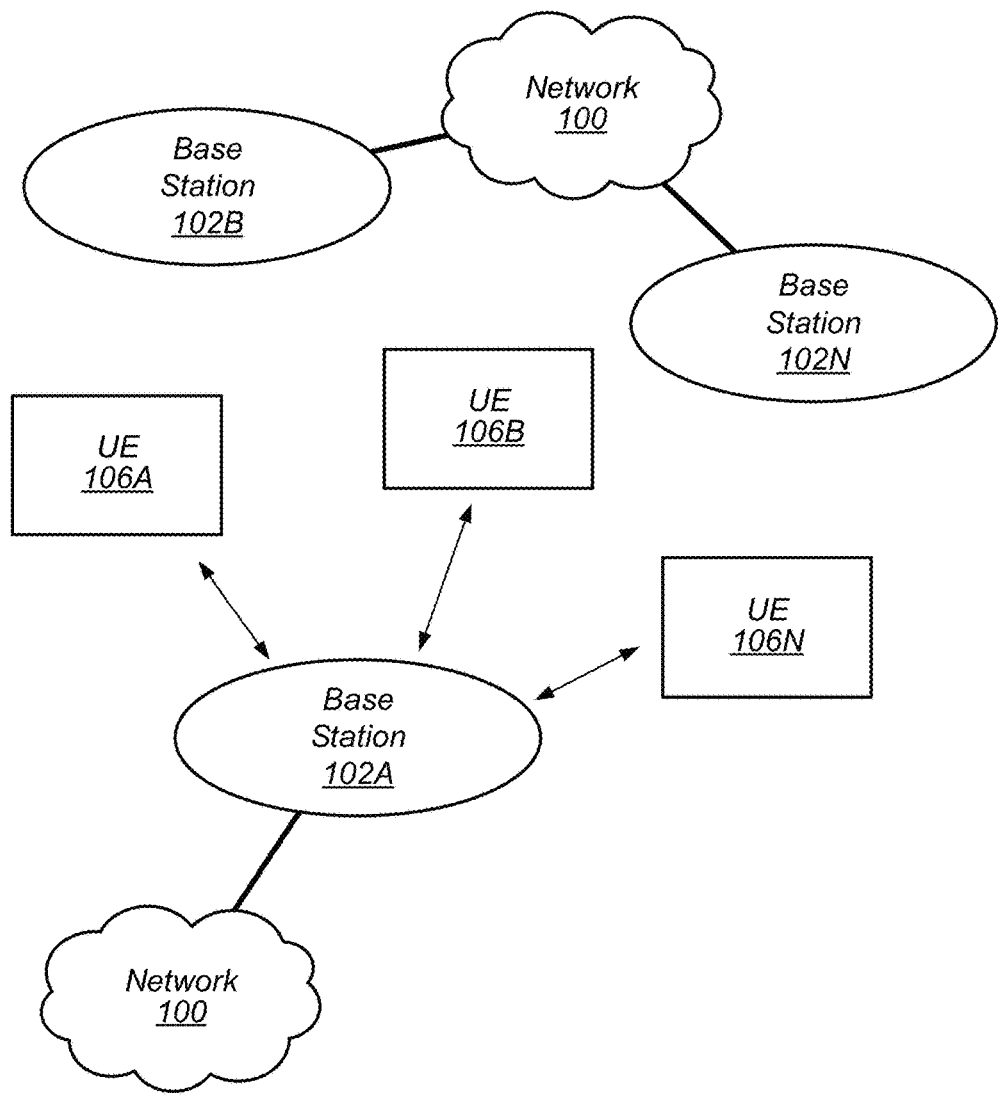
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™ Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
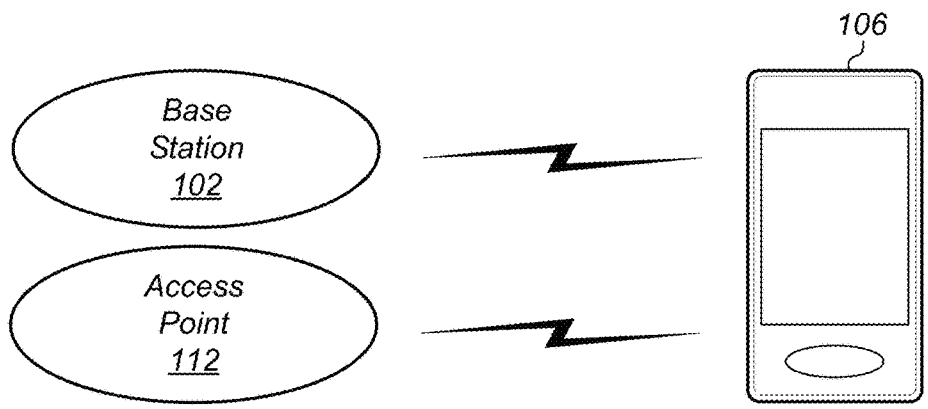
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
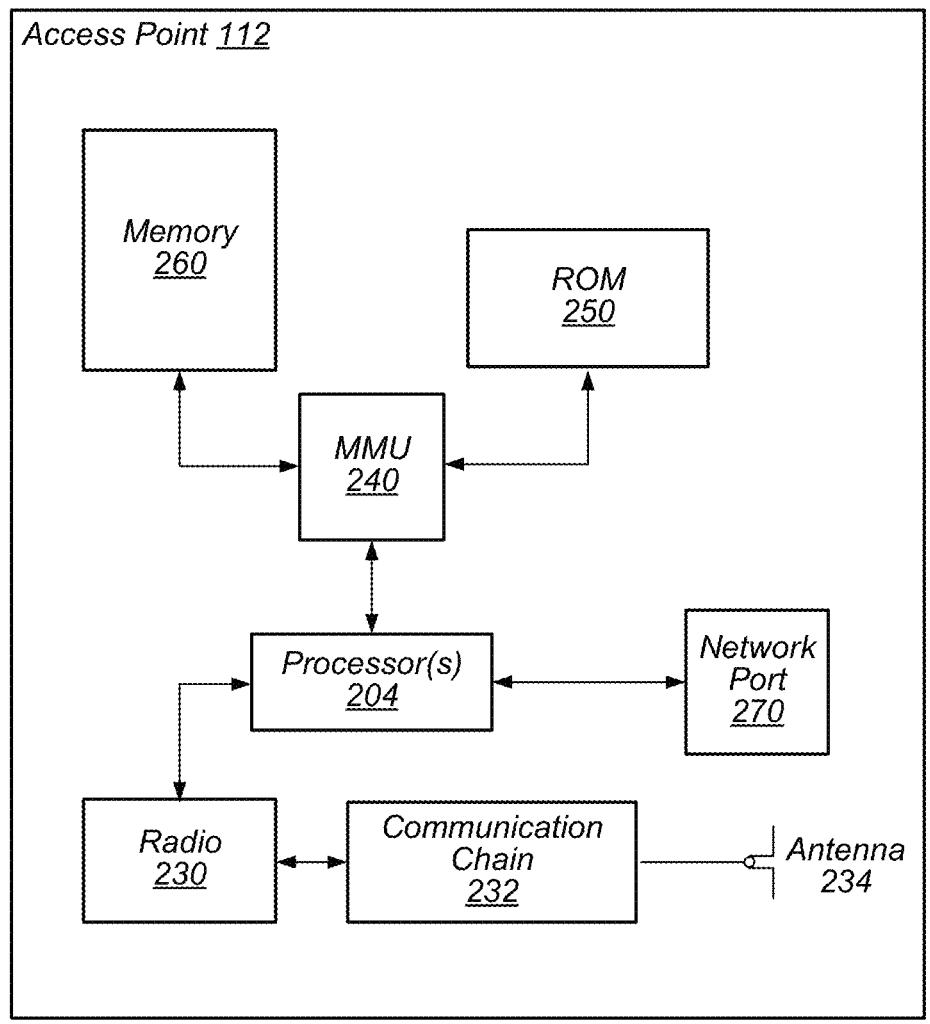
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to implement methods for autonomous and non-autonomous side-link resource management as well as groupcast side-link resource management, e.g., as further described herein.

Figure 3:
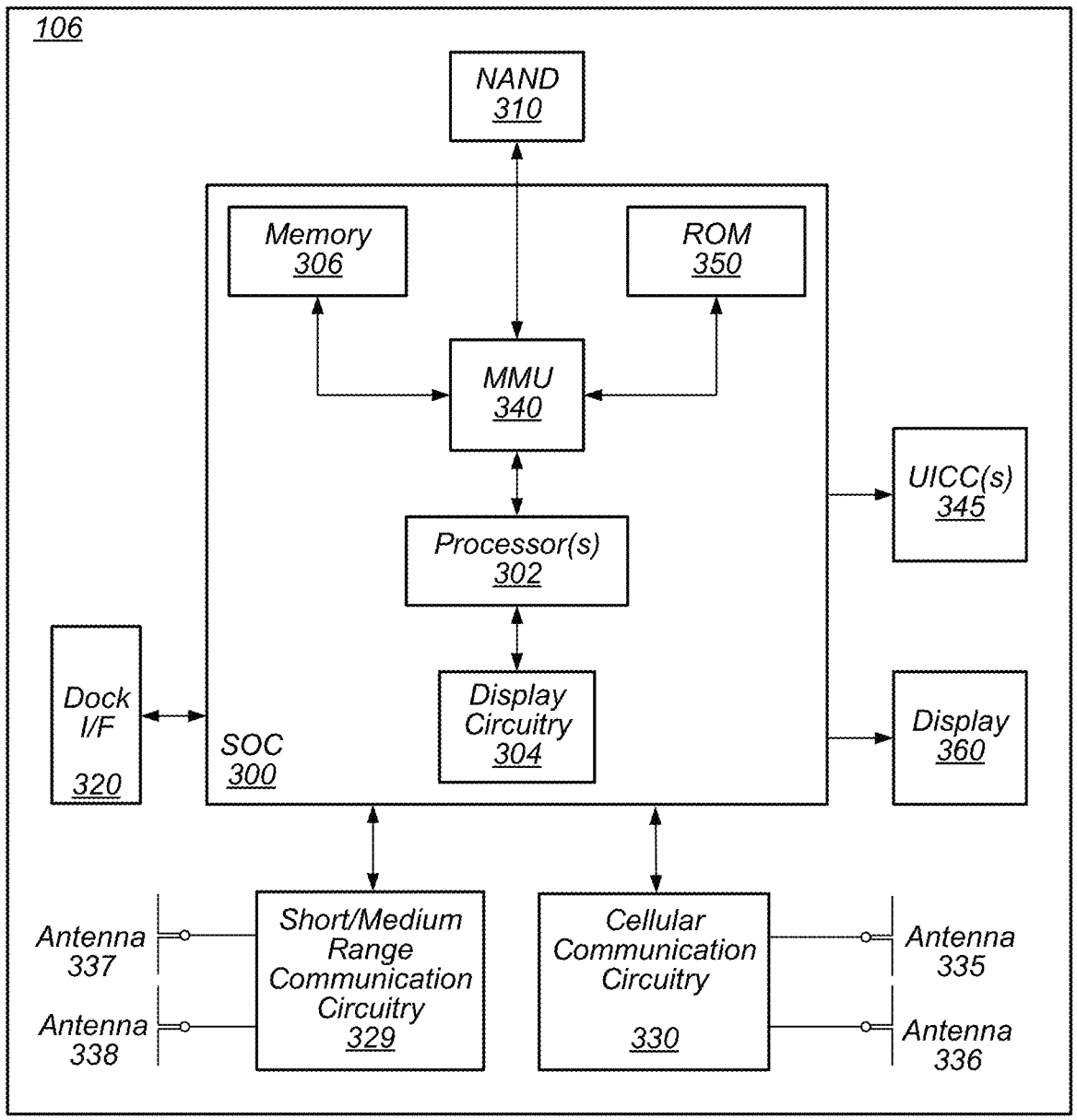
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for autonomous (e.g., non-network assisted) side-link resource management, e.g., the communication device 106 may perform a method to originate a semi-persistent side-link schedule for a resource. In some embodiments, the method may include determining status of the communication device 106 within a set of communication devices 106 and listening, based on the determined status, for resource occupancy messages broadcast within the set of communication devices 106 for a first time period. Further, the method may include determining, based, at least in part, on resource occupancy messages received during the first time period, available transmission resources within the set of communication devices 106, including an associated duration of the available transmission resources and broadcasting a first resource occupancy message announcing a reservation of available transmission resources for the associated duration. In some embodiments, the first resource occupancy message may include a schedule of resource blocks the communication device 106 will transmit in, a periodicity of resource occupancy, and a time remaining for the resource occupancy.

Additionally, in some embodiments, a communication device 106 may perform a method for groupcast side-link resource management. In some embodiments, the method may include determining that a pre-defined side-link resource is scheduled for the communication device 106 and in response to determining that the communication device 106 does not have data to transmit during the pre-defined side-link resource, marking the pre-defined side-link resource as donated to a neighboring communication device 106. In some embodiments, the communication device 106 and neighboring communication device 106 may be included in a group of communication devices 106 participating in a side-link groupcast. In some embodiments, the method may also include transmitting data during the pre-defined side-link resource in response to determining that the communication device 106 does have data to transmit during the pre-defined side-link resource. In such embodiments, if the communication device 106 has addition data to transmit at the end of the pre-defined side-link resource, the method may include marking a buffer status report to indicate the additional data to neighboring communication devices 106 in the group of communication devices 106 participating in the side-link groupcast. In some embodiments, the method may further include receiving, from at least one neighboring communication device 106, a donation of pre-defined side-link resources and transmitting the additional data during the donated pre-defined side-link resources.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short-range wireless communication circuitry 329 may include one or more ICs that are configured to perform the functions of short-range wireless communication circuitry 329. In addition, each integrated circuit may include circuitry (e.g., first circuitry, second circuitry, etc.) configured to perform the functions of short-range wireless communication circuitry 329.

Figure 4:
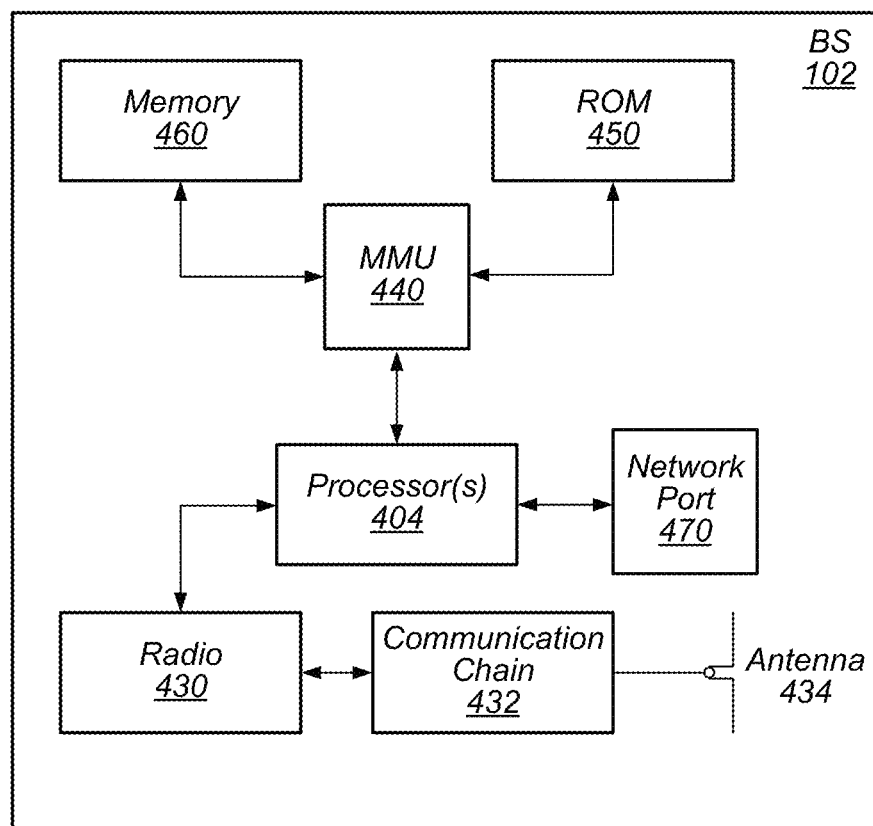
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
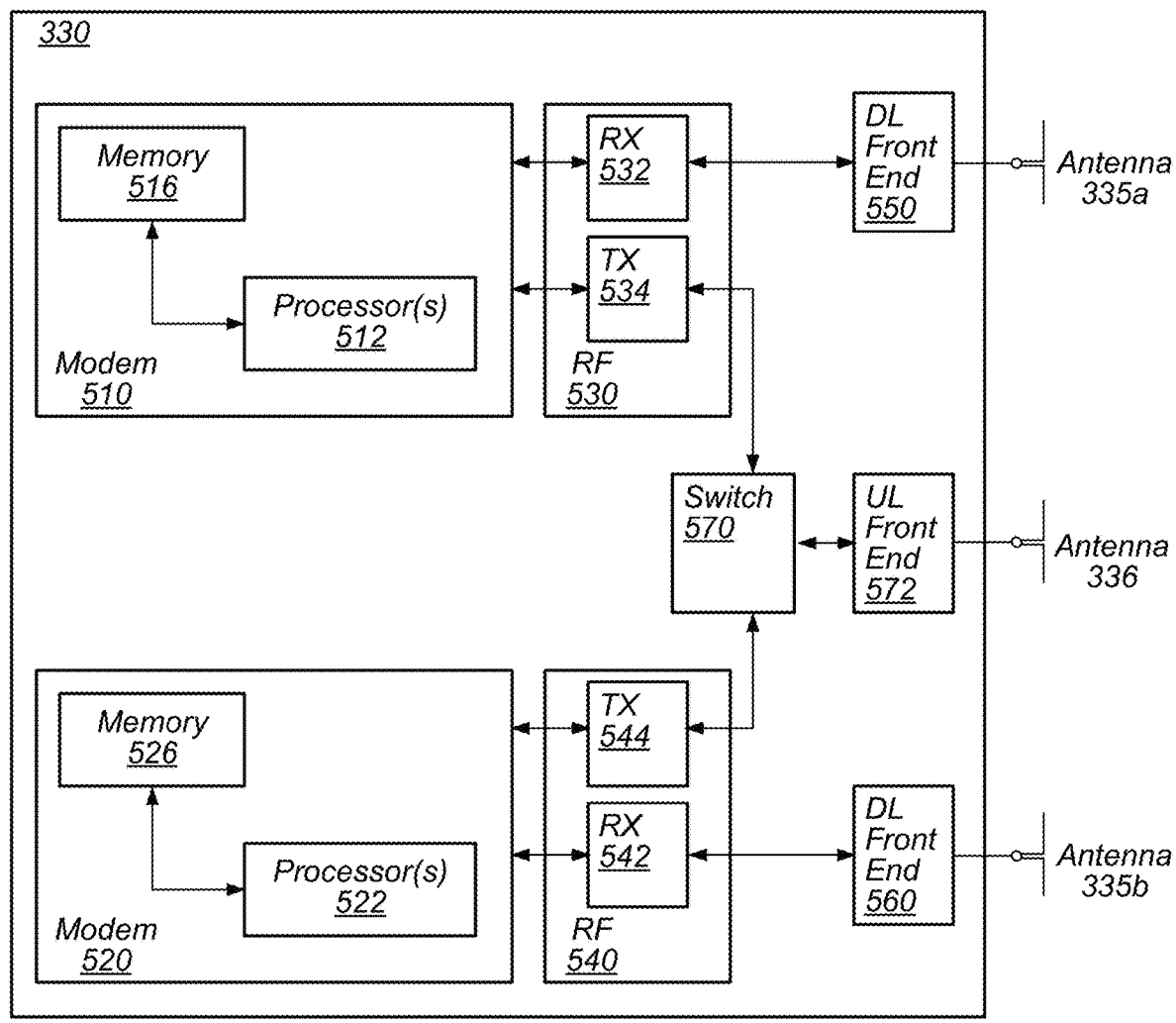
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for autonomous and non-autonomous side-link resource management as well as groupcast side-link resource management, e.g., as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
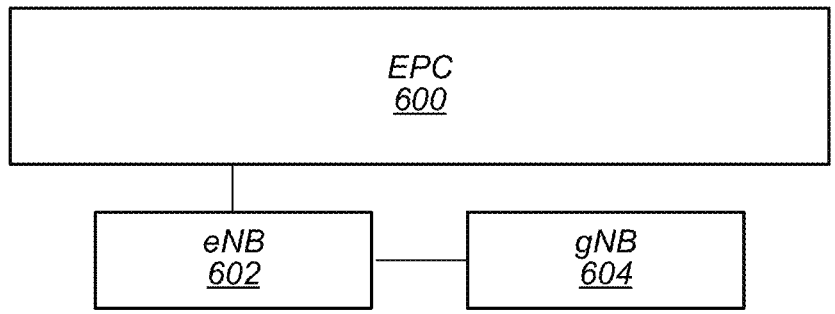
FIG. 6A illustrates an example of connections between an EPC network, an LTE base station (eNB), and a 5G NR base station (gNB).
Figure 6B:
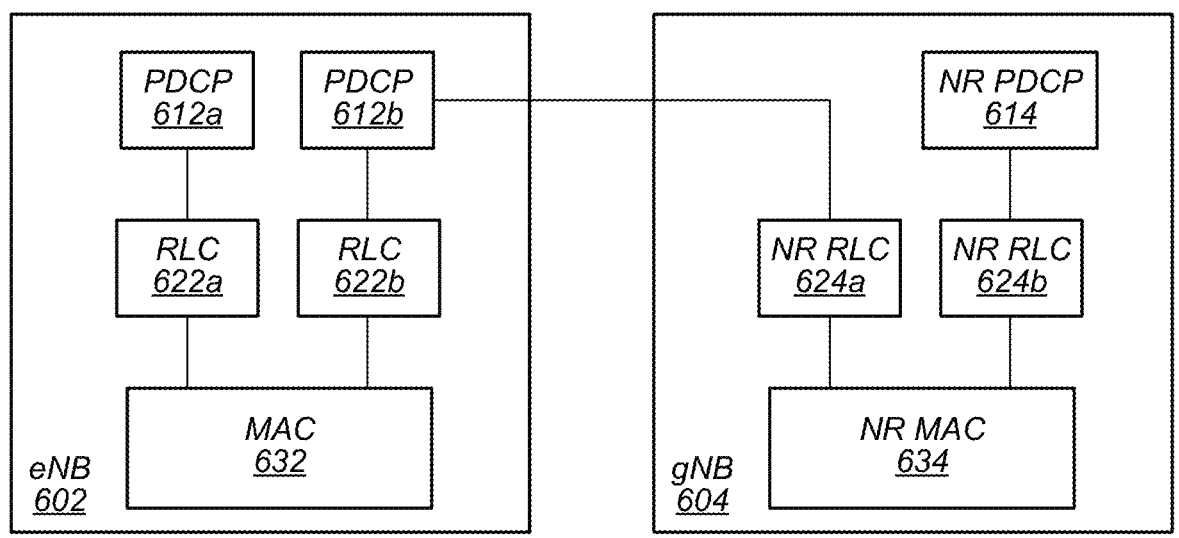
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
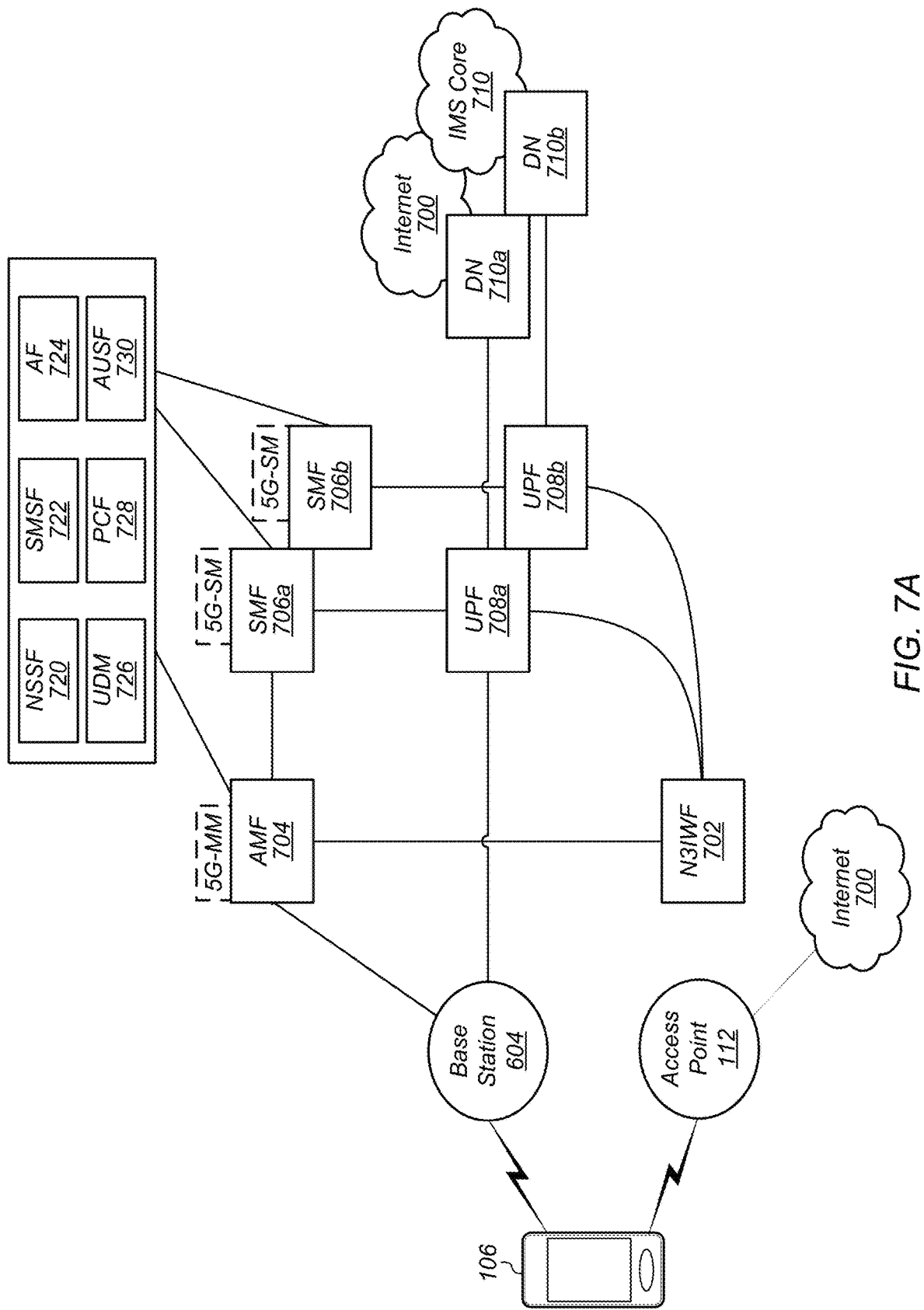
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Figure 7B:
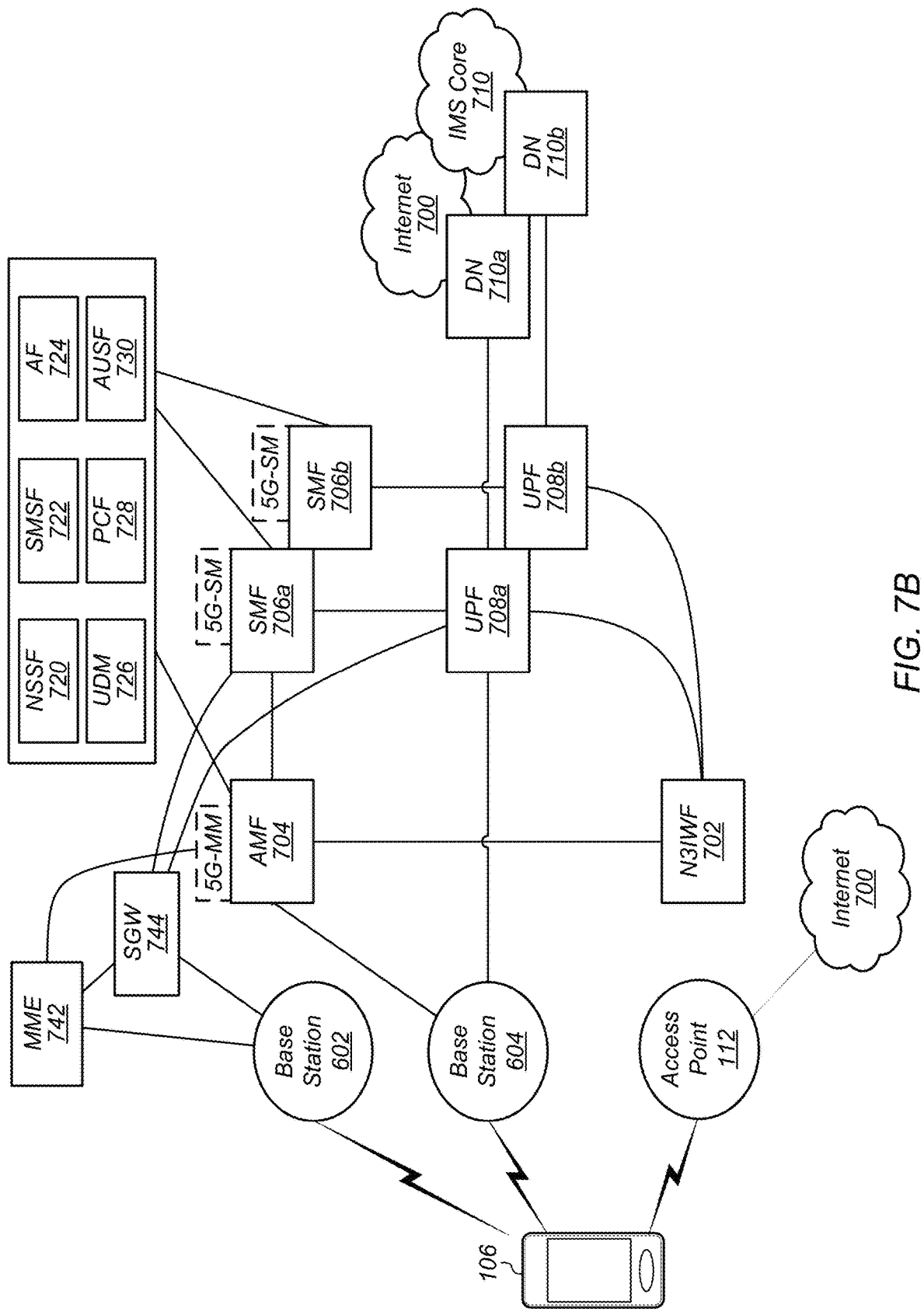
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706*a* and the SMF 706*b* of the 5G CN. The AMF 706 may be connected to (or in communication with) the SMF 706*a*. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Note that in various embodiments, one or more of the above described network entities may be configured to perform methods to implement mechanisms for autonomous and non-autonomous side-link resource management as well as groupcast side-link resource management, e.g., as further described herein.

Figure 8:
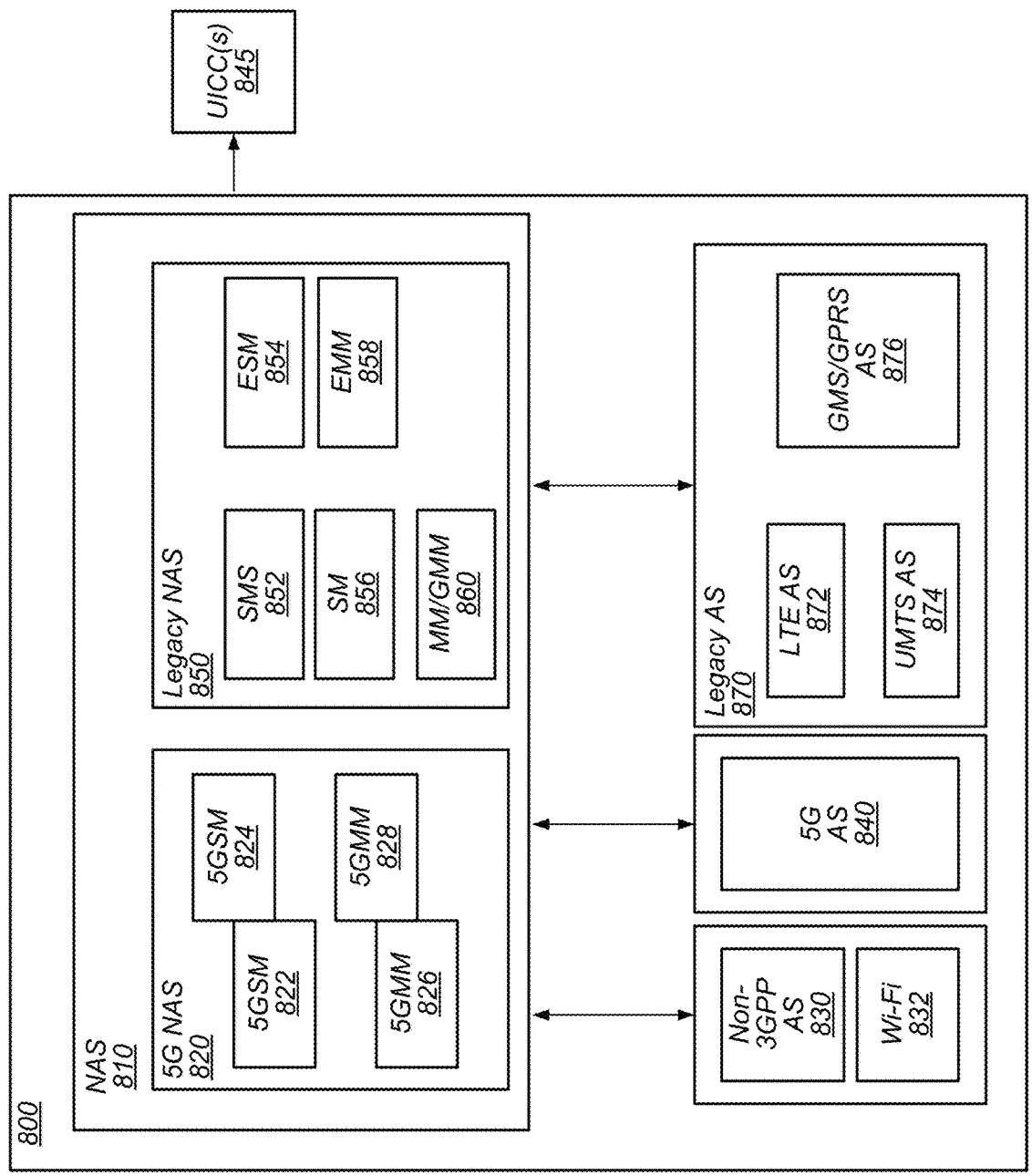
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods to implement mechanisms for autonomous and non-autonomous side-link resource management as well as groupcast side-link resource management, e.g., as further described herein.

Side-Link Resource Management

In some existing implementations, a listen before talk (LBT) mechanism may be used to access shared medium (e.g., such as unlicensed bands commonly used for Wi-Fi, Bluetooth, and other short to medium range communications, e.g., non-3GGP access) to avoid collisions (e.g., of transmissions emanating from two or more wireless devices attempting to access the shared medium) and to improve medium utilization efficiency. However, LBT mechanisms are not collision free. In other words, LBT mechanisms cannot guarantee collision free transmissions.

For example, in the case of a uni-cast transmission, a transmitter may readily detect a transmission collision based on a receiver's acknowledgement/negative acknowledgement (ACK/NACK) feedback. However, in the case of a multi-cast (or group-cast) transmission, a transmitter may not easily detect a collision based on receivers' ACK/NACKs due, at least in part, to heavy traffic associated with ACK/NACKs from multiple receivers and to a transmitter's inability to distinguish between (or isolate) transmission collisions from channel quality issues based on received ACK/NACKs. In other words, since receivers in a multi-cast transmission may have different locations with differing channel quality, a reason for a NACK (e.g., transmission collision versus poor channel quality) cannot be determined by the transmitter. Additionally, in the case of a broadcast transmission, feedback from receivers is known to not be feasible, so in this scenario, a transmitter would not have knowledge of collisions. Further, in some implementations, a transmitter may reserve periodic slots within a reservation period for communication. In such implementations, if collisions occur, the collisions could persist for at least a portion of the reservation period (and in a worst-case scenario, the duration of the reservation period) if the transmitter does not detect (or is unable to detect) the collisions.

Figure 9:
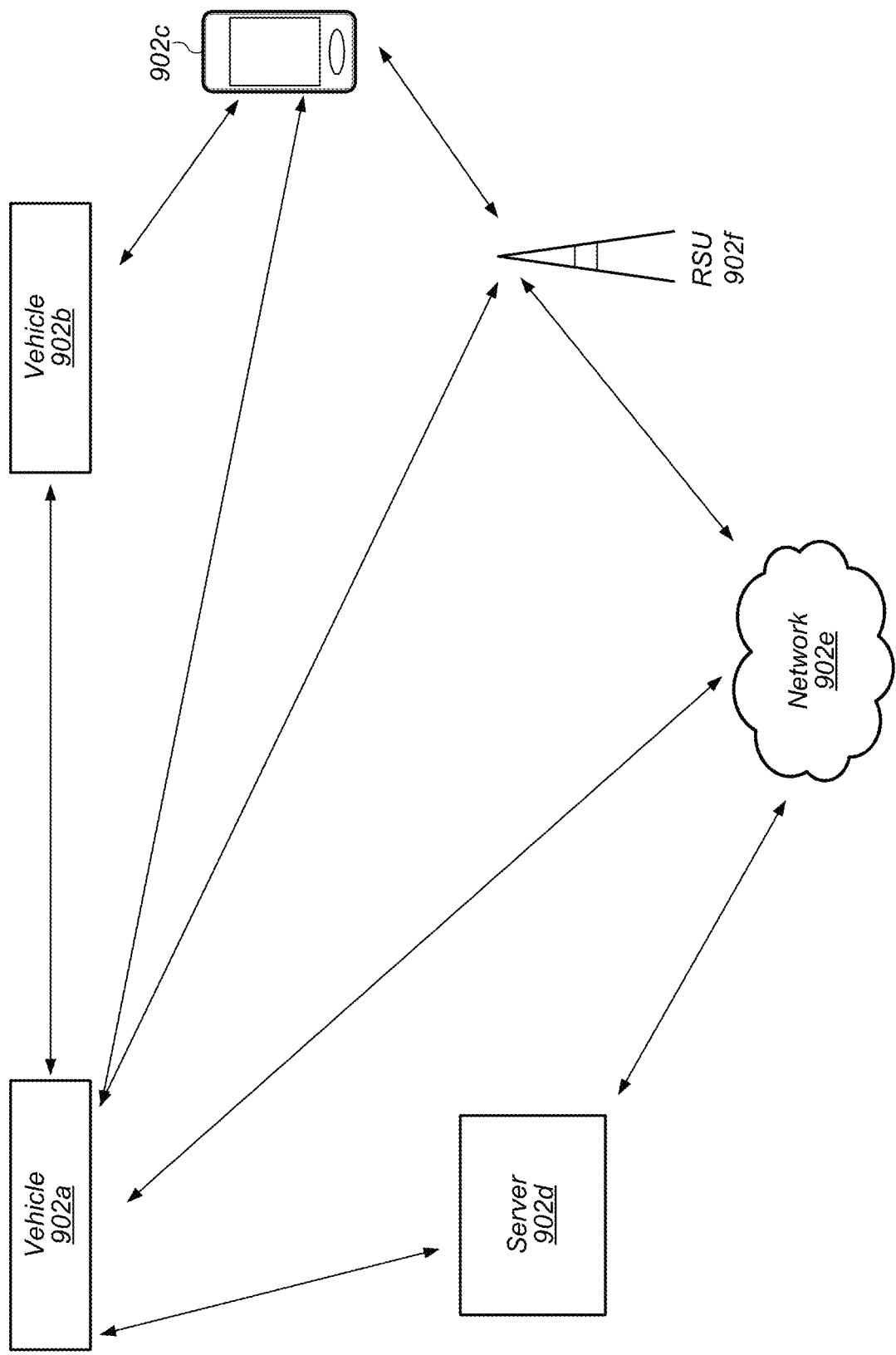
FIG. 9 illustrates an example of a vehicle-to-everything network.

As an example, vehicle-to-everything (V2X) communications, e.g., as specified by 3GPP TS 22.185 V.14.3.0, allows for communication between a vehicle (e.g., a mobile unit within a vehicle, such as a wireless device comprised within or currently contained within a vehicle and/or another transmitter contained or comprised with a vehicle) and various wireless devices. For example, as illustrated by FIG. 9, a vehicle, such as vehicle 902a, may communicate with various devices (e.g., devices 902b-f), such as road side units (RSUs), infrastructure (V2I), network (V2N), pedestrian (V2P), and/or other vehicles (V2V). In addition, as shown, all devices within the V2X framework may communicate with other devices. V2X communications may utilize both long range (e.g., cellular) communications as well as short to medium range communications (e.g., non-cellular). In some contemplated implementations, the non-cellular communications may use unlicensed bands as well as a dedicated spectrum at 5.9 GHz. Moreover, V2X communications may include uni-cast, multi-cast, groupcast, and/or broadcast communications. Each communication type may employ an LBT mechanism. Further, under the V2X communication protocol, a transmitter may reserve periodic slots within a reservation period. Thus, as described above, in various cases a transmitter utilizing V2X communications, may, in some instances, be unable to detect collisions after using an LBT mechanism.

Embodiments described herein provide mechanisms for side-link resource management for both network assisted resource management and autonomous (e.g., non-network assisted) resource management. In some embodiments, the mechanisms described herein may provide improved spectrum efficiency, reduced resource conflict (e.g., collisions), and/or reduced resource latency. In some embodiments, a UE. such as UE 106, may originate a semi-persistent side-link schedule for a resource. In some embodiments, a UE may broadcast a resource occupancy message (RO message) periodically. In some embodiments, the RO message may include resource blocks (RBs) and/or sub-frames to be used (scheduled), a periodicity of resource occupancy (e.g., reservation), and/or, a time remaining for the resource occupancy (e.g., reservation). In some embodiments, the periodicity of the broadcast of the RO message may be greater than a safety message periodicity. In other words, RO messages may not be transmitted more often than safety messages. In addition, in some embodiments, a maximum allowed channel occupancy time (T_max_COT) may be defined. In such embodiments, an initial remaining time of the resource occupancy may not exceed the maximum allowed channel occupancy time. In other words, the resource occupancy may only be for a time less than the maximum allowed channel occupancy time. In some embodiments, when a UE enters a new system (e.g., a new set of UEs and/or a new location), the UE may sense (listen) to a channel to collect existing UEs RO messages to determine available resources in the new system. In other words, prior to transmitting a RO message when entering a new set of UEs/area (e.g., a set of UEs with proximity for side-link communications), the UE may determine available resources via reception of RO messages from neighboring UEs. In some embodiments, upon expiration of a resource occupancy, a UE, prior to transmitting a new RO message, may determine available resources via reception of RO messages from neighboring UEs.

Figure 10:
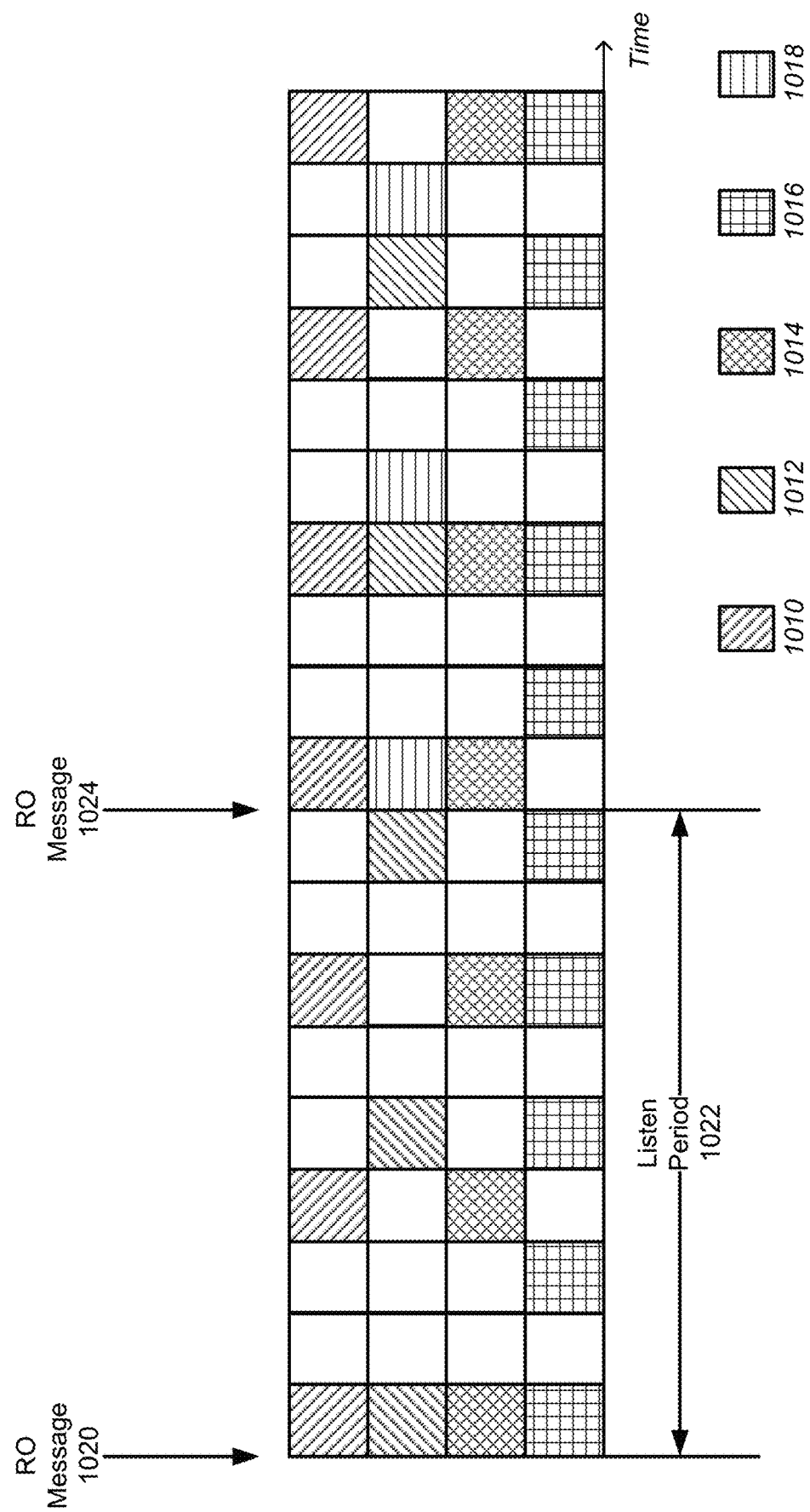
FIG. 10 illustrates an example diagram of a schedule for a set of UEs that are joined by a new UE, according to some embodiments.

For example, FIG. 10 illustrates an example diagram of a schedule for a set of UEs that are joined by a new UE, according to some embodiments. As illustrated in FIG. 10, a set of UEs (e.g., UEs 1010, 1012, 1014, and 1016) may have a semi-persistent schedule in which the various UEs of the set have scheduled resource blocks, where a resource block includes at least one (or one or more) sub-frame. Note that a set of UEs may be considered as a plurality of neighboring UEs within side-link communication range of one another. As shown, UE 1010 may transmit in every third resource block on a particular channel/frequency (e.g., a first channel/frequency). Similarly, UE 1014 may also transmit in every third resource block on a particular channel/frequency (e.g., a second channel/frequency) different from UE 1010. Additionally, UE 1016 may transmit in every second (or every other) resource block on a third channel/frequency. Further, UE 1012 may transmit in every fourth resource block on a fourth channel/frequency. Thus, when UE 1018 encounters the set of UEs, it may broadcast a RO message prior to a set of resource blocks (e.g., RO message 1020). Additionally, UE 1018 may listen to the various channels/frequencies within the set of UEs for a period of time (e.g., listen period 1022). During this period of time, UE 1018 may determine available resource blocks and/or available channels/frequencies. Further, at the end of the period of time, UE 1018 may broadcast a RO message (e.g., RO message 1024) indicating UE 1018's resource occupancy. Hence, as shown, UE 1018 may then begin to transmit in every fourth resource block on the fourth channel/frequency immediately after a resource block reserved by UE 1012.

Figure 11:
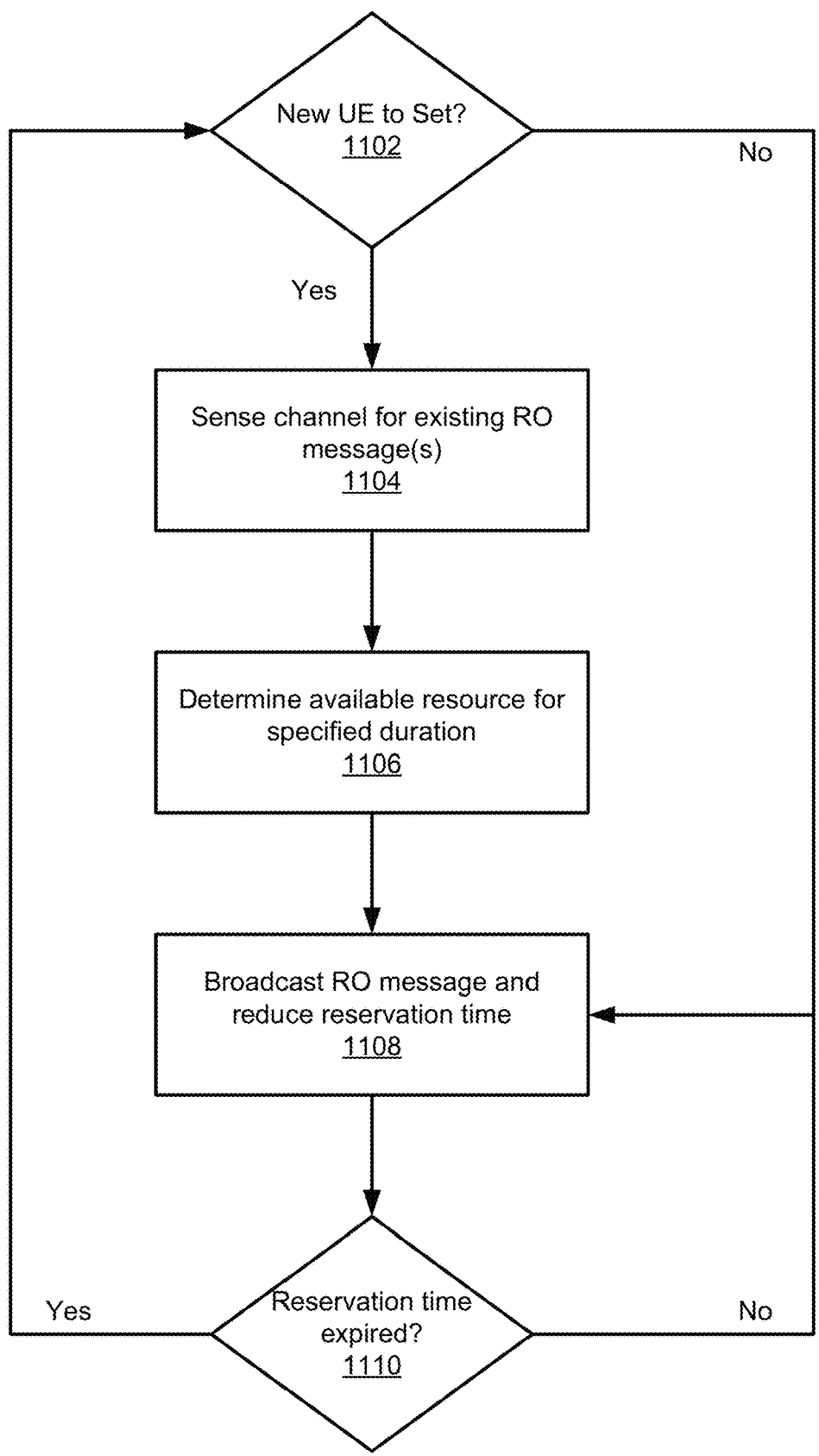
FIG. 11 illustrates a block diagram of an example of a method for determining available side-link resources within a set of UEs, according to some embodiments.

FIG. 11 illustrates a block diagram of an example of a method for determining available side-link resources within a set of UEs, according to some embodiments. The method shown in FIG. 11 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106, may determine whether the UE is new to a set of UEs and/or requires a new reservation within the set of UEs. In some embodiments, a UE may determine that it requires a new reservation within the set of UEs, based, at least in part, on a reservation time of a prior reservation expiring. In some embodiments, a UE may consider itself new to the set of UEs based, at least in part, on a mobility condition of the UE and/or a location change of the UE (e.g., greater than a specified distance).

At 1104, in response to determining that the UE is new to the set of UEs and/or needs a new reservation, the UE may sense (listen) on a channel(s) for existing RO messages. For example, the UE may scan one or more channels to receive RO messages being broadcast by UEs within the set of UEs (e.g., neighboring UEs).

At 1106, based on the received RO messages, the UE may determine available resources and an associated duration of the available resources. In other words, the UE may determine a resource allocation and a duration of the resource allocation (e.g., reservation time) based, at least in part, on the received RO messages from neighboring UEs.

At 1108, the UE may broadcast an initial RO message and begin to reduce the reservation time.

At 1110, the UE may determine whether the reservation time has expired. If the reservation time has not expired, the method may continue at 1108 and the UE may broadcast another RO message and continue to reduce the reservation time. If the reservation time has expired, the method may continue at 1102 and the UE may determine whether the UE is new to the set of UEs and/or requires a new reservation within the set of UEs.

Note that if the UE determines that it is not new to the set of UEs and/or does not require a new reservation, the UE may continue to broadcast its RO message as at 1108.

In some embodiments, a network (e.g., a serving node such as base station 604) may assist with side-link resource management. Note that in some instances, due to half-duplex design of existing side-link schemes, if two adjacent UEs send a message at the same time (e.g., in the same sub-frame), the UEs will not be able to receive the message one another. Further, existing schemes may not allow for frequency domain re-use when UEs are not within side-link range. Thus, in some embodiments, a network (e.g., a node such as base station 604) may coordinate spatial reuse of frequency and/or time resources based on network knowledge of UE distance and mobility.

For example, a base station (e.g., gNB 604) may assign time and/or frequency domain resources based on relative distance between UEs and/or mobility of UEs. Such assignment may avoid resource conflict and/or improve spectral efficiency. For example, in some embodiments, sets of UEs (e.g., neighboring UEs within side-link proximity of one another) may reuse spectrum and/or time resources. Additionally, within a set of UEs, unicast transmissions between UEs may reuse spectrum and/or time resources via beamforming.

In some embodiments, a UE may report its location to the network and/or the network may determine UE location using various methods. For example, if a base station is capable of monitoring side-link communications, the base station may determine/obtain UE location via monitoring broadcast safety messages (BSMs) from UEs. In some embodiments, a UE may transmit location information to the base station via periodic and/or event triggered reporting. For example, in some embodiments, a periodic update may be based on periodic physical uplink shared channel (PUSCH) type 1 resource allocation configured by the base station. As another example, in some embodiments, an event-based update may be based on one or more criteria, e.g., such as position changes more than a specified (or pre-configured) threshold or a transition to a new location zone. In some embodiments, the base station may request location information from the UE. For example, the base station may set a timer for location updates from a UE and reset the timer each time the location of the UE is updated. However, if the timer expires prior to the UE updating its location, the base station may request the location to be updated. In some embodiments, a road side unit may relay the location of the UE (e.g., based on side-link monitoring) to the base station via one of a backhaul connection or a uU interface between the base station and the road side unit.

In some embodiments, the base station may estimate the UE location without information provided by the UE. In other words, the base station may autonomously estimate the UE's location. In some embodiments, the estimate may be based, at least in part, on beam forming angle (e.g., direction from the base station) and/or pathloss (distance from the base station). Such estimates may aid in determining whether UEs are far enough from one another to allow for spatial reuse of frequency and/or time resources.

Figure 12:
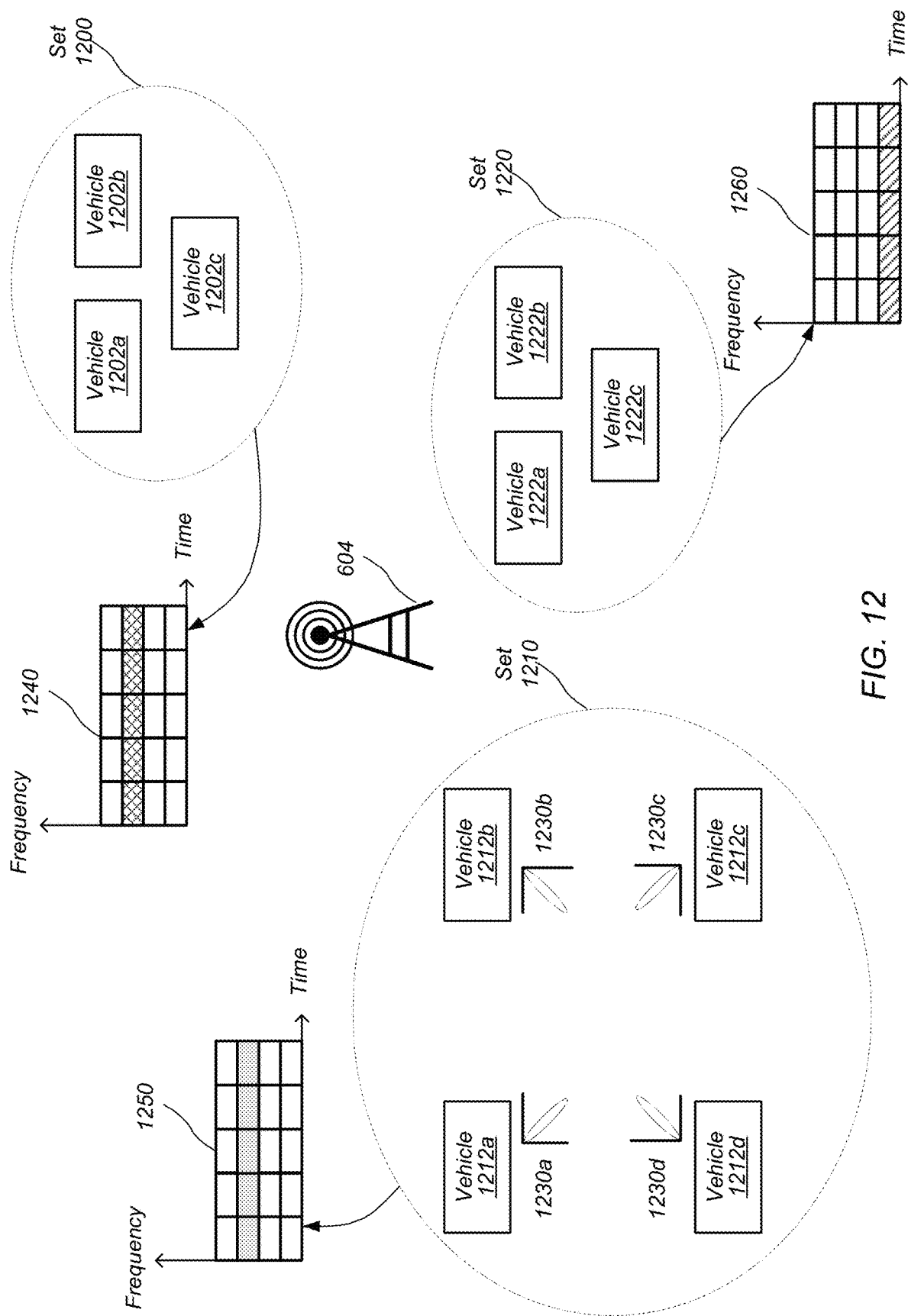
FIG. 12 illustrates an example of a network assisting with side-link resource management, according to some embodiments.

FIG. 12 illustrates an example of a network assisting with side-link resource management, according to some embodiments. As shown, base station 604 may serve multiple sets of UEs (e.g., sets 1200, 1210, and 1220). Each set may include one or more UEs (such as UE 106). For example, set 1200 UEs (e.g., vehicles 1202*a-c*) may have a side-link time/frequency schedule 1240 as assigned by base station 604. Similarly, set 1210 UEs (e.g., vehicles 1230*a-d*) may have a side-link time/frequency schedule 1250 as assigned by base station 604. Further, set 1220 UEs (e.g., vehicles 1222*a-c*) may have a side-link time/frequency schedule 1260 as assigned by base station 604. Note that base station 604 may determine (e.g., based on location of the UEs within each set) that sets 1200 and 1210 are far enough from one another that the base station 604 may assign the same time/frequency resources to both sets. Conversely, base station 604 may determine (e.g., based on location of the UEs within each set) that sets 1210 and 1220 are close enough proximity of one another that the base station 604 may assign different time/frequency resources to the sets. Additionally, with set 1210, the base station 604 may allocate the same resources for unicast transmissions between vehicles 1230*a* and 1230*c* and vehicles 1230*b* and 1230*d* via adjustment of beamforming for the unicast pairs.

Groupcast Side-Link Resource Management

As noted above, existing listen before talk and/or resource reservation approaches cannot resolve resource conflicts and/or avoid collisions in groupcast side-link scenarios. In addition, existing mechanisms are not efficient for obtaining large amounts of resources for delivery of larger payloads. Embodiments described herein provide mechanisms for improved groupcast side-link resource management. Some embodiments provide mechanisms within a side-link groupcast to alleviate resource conflict/competition, eliminate resource waste, and provide fairness for differing payloads.

Note that within a groupcast, it may be assumed that participants within the groupcast are known to one another, thus additional information may be shared between participants to allow for better resource management. In addition, it may be assumed that a particular resource pool is dedicated to a particular groupcast.

In some embodiments, time domain resources may be evenly pre-allocated to each participant (e.g., UE, such as UE 106) within the groupcast. For example, a first UE may be allocated a first resource block (e.g., including one or more sub-frames), a second UE may be allocated a second resource block (e.g., including an identical number of sub-frames as the first resource block) and so forth. Further, each UE may use its pre-allocated resource block without competing with other UEs within the groupcast. In addition, if the UE has additional data (and/or higher priority data) at the conclusion of its pre-allocated resource block, the UE may indicate such additional needs via a BSR or quality of service (QoS) announcement to the other UEs within the groupcast. In some embodiments, if another UE does not have any data to transmit and/or determines that it will not use all of its pre-allocated resource block, it may donate any portion of its pre-allocated resource block to a UE that may need additional resources to transmit data. Additionally, the UE receiving the donation may immediately use the remaining resources without contention from other UEs within the groupcast. In some embodiments, selection of the UE to donate resources to may be based on any or all of BSR announcements, QoS announcements, and/or announced priority of data to be transmitted.

In some embodiments, a UE that receives a donated resource, may, prior to using the resource, compare its need (e.g., QoS requirements, priority requirements) to use the resource with needs announced by other UEs, and determine whether to use the donated resource or to donate the donated resource to another UE.

Figure 13:
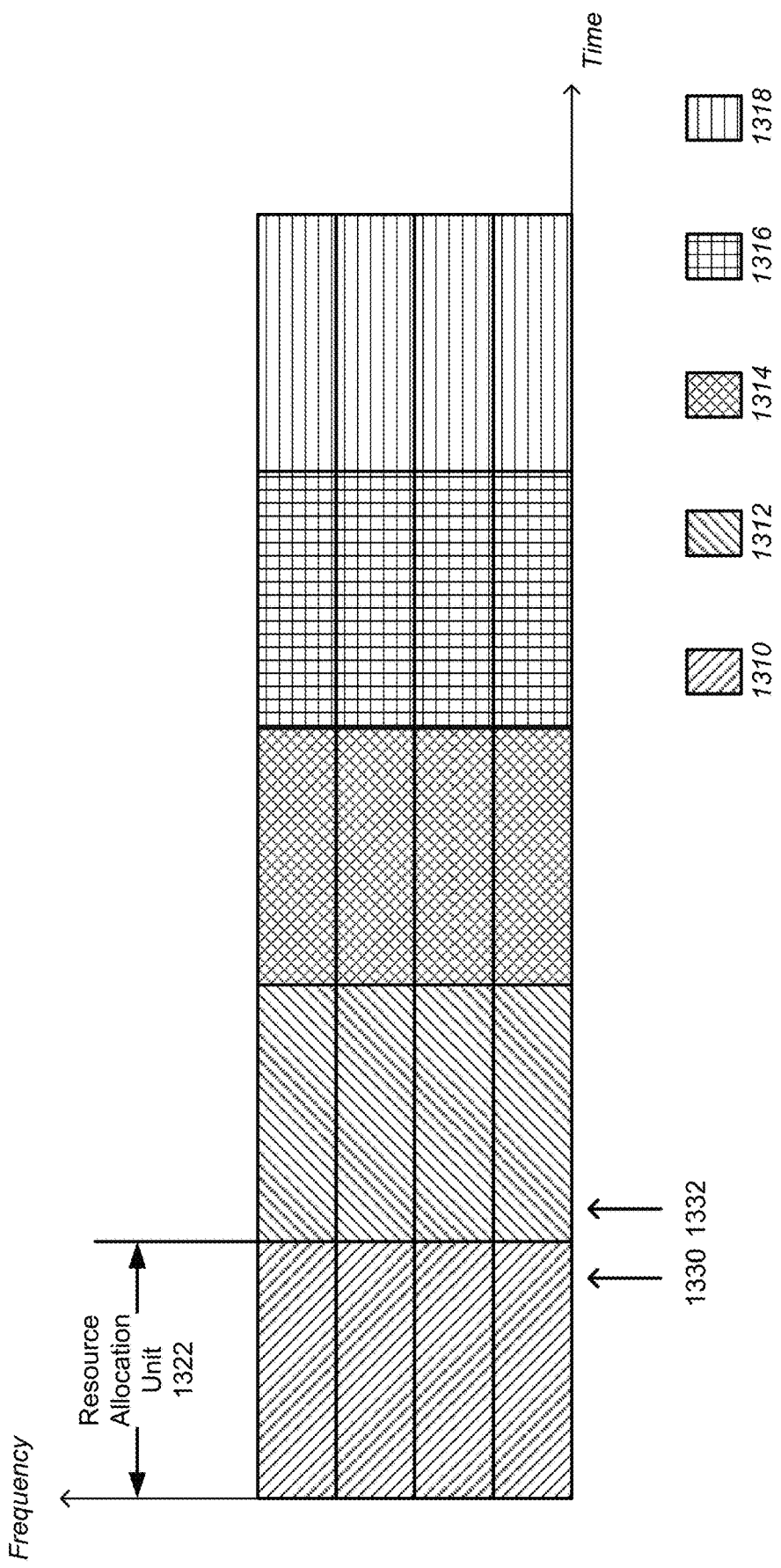
FIG. 13 illustrates an example of a pre-allocation of resources for UEs participating in a side-link groupcast, according to some embodiments.

For example, FIG. 13 illustrates an example of a pre-allocation of resources for UEs participating in a side-link groupcast, according to some embodiments. As shown, each UE (e.g., UE 1310, 1312, 1314, 1316, and 1318) may be allocated identical resources. In other words, each UE may be allocated a resource allocation unit 1322, which may be one or more resource blocks, where a resource block includes at least one sub-frame. As shown, the UEs may announce data requirements (e.g., at 1324) at the end of each resource allocation unit. The next scheduled UE may then determine (e.g., at 1326) whether to donate a portion (up to and including its entire resource allocation unit) to another UE within the groupcast. For example, UE 1312 may determine that it has no pending data to transmit and may donate its resource allocation unit to UE 1314. In some embodiments, UE 1314 may compare its resource requirements (e.g., QoS requirements, priority requirements, and so forth) to resource requirements announced by other UEs within the groupcast. For example, the UE 1314 may determine to further donate UE 1312's resource allocation to UE 1318, e.g., based on UE 1318's resource requirements being greater than UE 1314's resource requirements. Note that in some embodiments, UE may determine to use a portion of the donated resources and to further donate a remaining portion of the donated resources.

Figure 14:
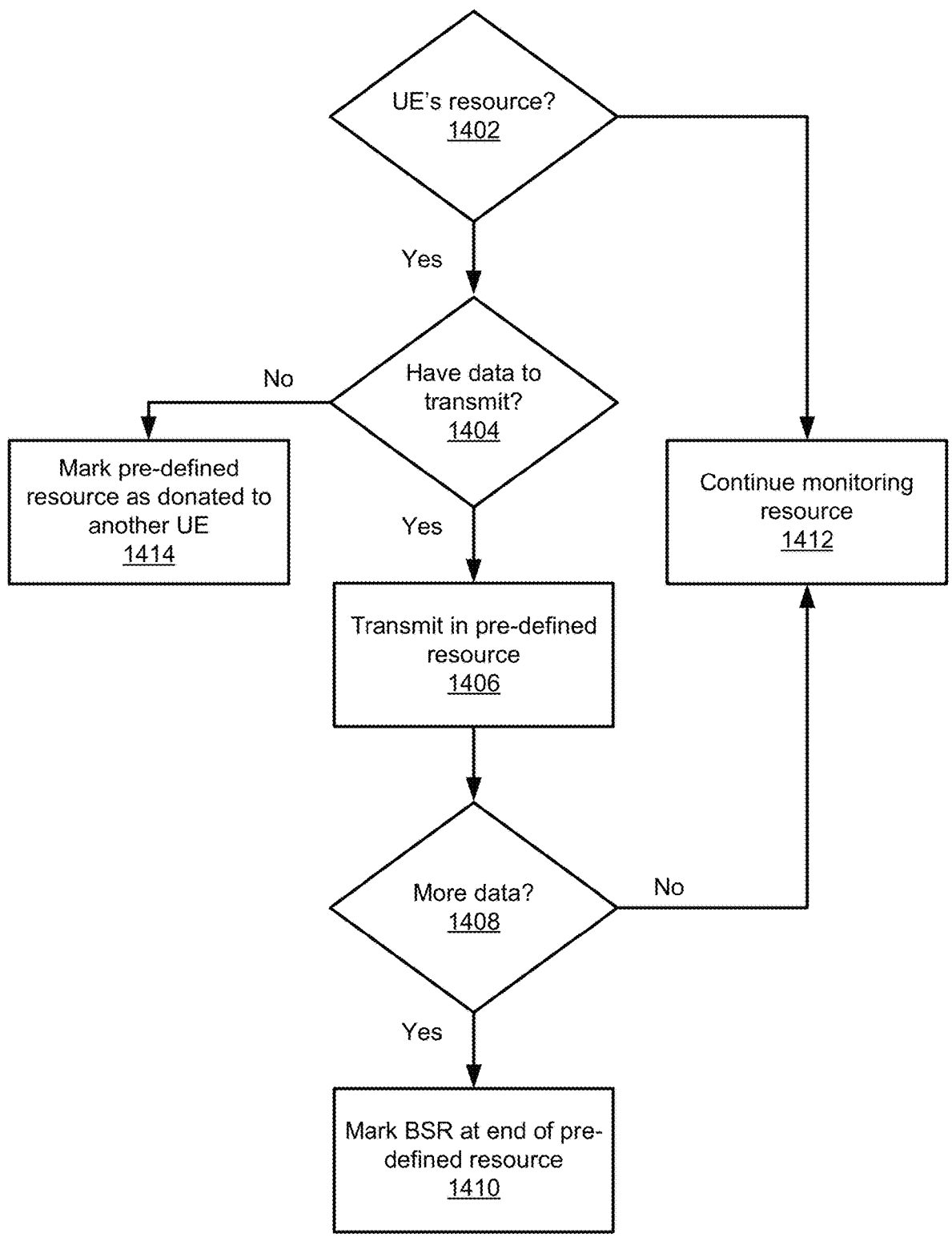
FIG. 14 illustrates a block diagram of an example of a method for determining whether to use pre-allocated side-link resources within a groupcast, according to some embodiments.

FIG. 14 illustrates a block diagram of an example of a method for determining whether to use pre-allocated side-link resources within a groupcast, according to some embodiments. The method shown in FIG. 14 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1402, a UE may determine whether a pre-defined resource (e.g., resource allocation unit) is the UE's resource. If the pre-defined resource is not the UE's resource, the method may continue at 1412 and the UE may continue to monitor resources. If the pre-defined resource is the UE's resource, the method may continue at 1404.

At 1404, the UE may determine whether it has data to transmit. If the UE does not have data to transmit, the method may continue to 1414 and the UE may mark the pre-defined resource as donated to another UE. However, if the UE determines it does have data to transmit, the method may continue at 1406, and the UE may transmit in the pre-defined resource.

At 1408, the UE may determine (e.g., at the end of the pre-defined resource) whether the UE has additional data and/or higher priority data (e.g., based on QoS requirements) to transmit. If the UE does not have additional data and/or higher priority data to transmit, the method may continue at 1412 and the UE may continue to monitor resources. However, if the UE does have additional data and/or higher priority data to transmit, the method may continue at 1410 and the UE may mark a BSR at the end of the pre-defined resource to indicate to neighboring UEs within the groupcast that the UE has additional data and/or higher priority data to transmit.

In some embodiments, multiple groups may be competing for radio resources. In such embodiments, if there is eNB (e.g., eNB 602) or gNB (e.g., gNB 604) coordination, group resources may be allocated dynamically. In some embodiments, if there is no eNB or gNB coordination, each group may sense and reserve resources for its own group and then allocate the reserved resources within the group, e.g., as discussed above with reference to FIGS. 13 and 14.

Figure 15:
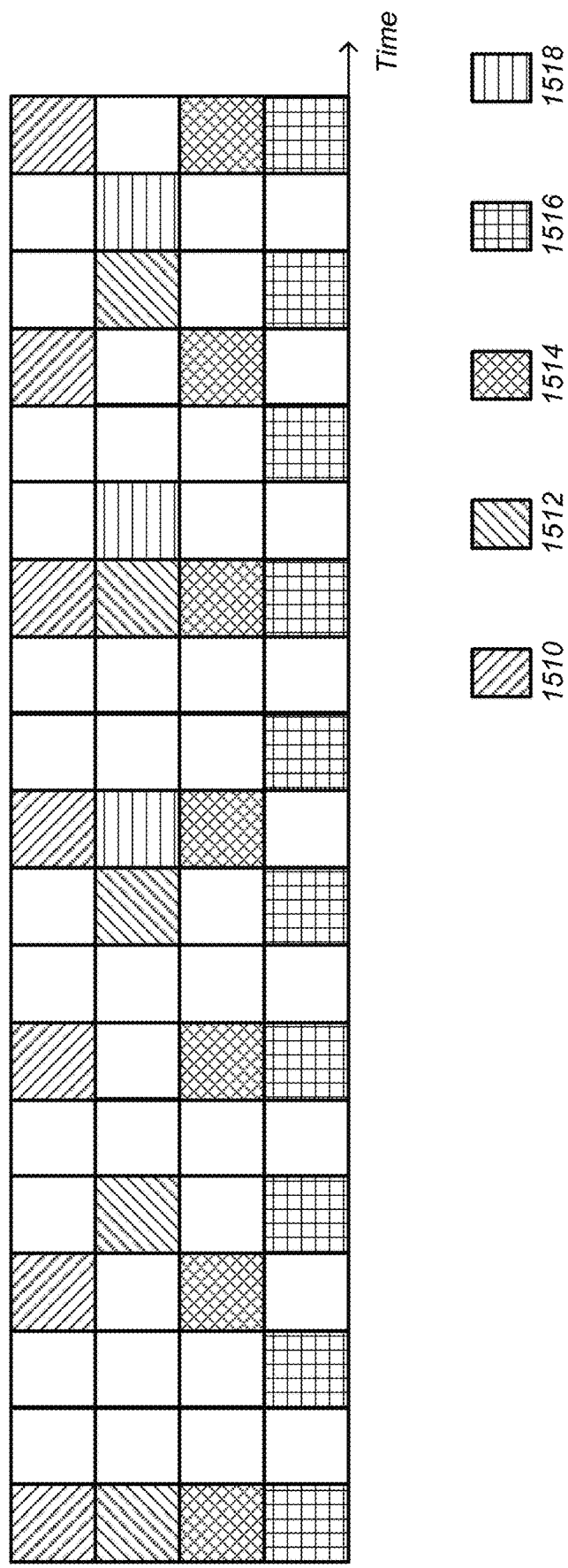
FIG. 15 illustrates an example of resource allocation amongst groups (e.g., groupcasts), according to some embodiments.

For example, FIG. 15 illustrates an example of resource allocation amongst groups (e.g., groupcasts), according to some embodiments. As shown, each group of UEs (e.g., groups 1510, 1512, 1514, 1516, and 1518) may reserve resources in both time and frequency. Note that a group of UEs may be considered a plurality of UEs participating in a groupcast communication. For example, group 1510 may transmit in every third resource allocation block on a particular channel/frequency (e.g., a first channel/frequency). Similarly, group 1514 may also transmit in every third resource allocation block on a particular channel/frequency (e.g., a second channel/frequency) different from group 1510. Additionally, group 1516 may transmit in every second (or every other) resource allocation block on a third channel/frequency. Further, group 1512 may transmit in every fourth resource allocation block on a fourth channel/frequency. Additionally, group 1518 may transmit in every fourth resource allocation block on the fourth channel/frequency immediately after a resource allocation block reserved by group 1512. In addition, within each group, reserved resource allocation blocks may be allocated to individual UEs participating within the group's side-link groupcast, e.g., as discussed above with reference to FIGS. 13 and 14.

Further Embodiments

FIGS. 16-20 illustrate further embodiments of the present disclosure. The embodiments illustrated by FIGS. 16-20 may be used in conjunction with one another as well any of the systems or devices shown in the above Figures, among other systems and devices. In some embodiments, a wireless device, such as UE 106 may be configured to perform and/or implement aspects of the illustrated embodiments. In some embodiments, a network node, such as base station 102, AP 112, eNB 602, and/or gNB 604 may be configured to perform and/or implement aspects of the illustrated embodiments.

Figure 16:
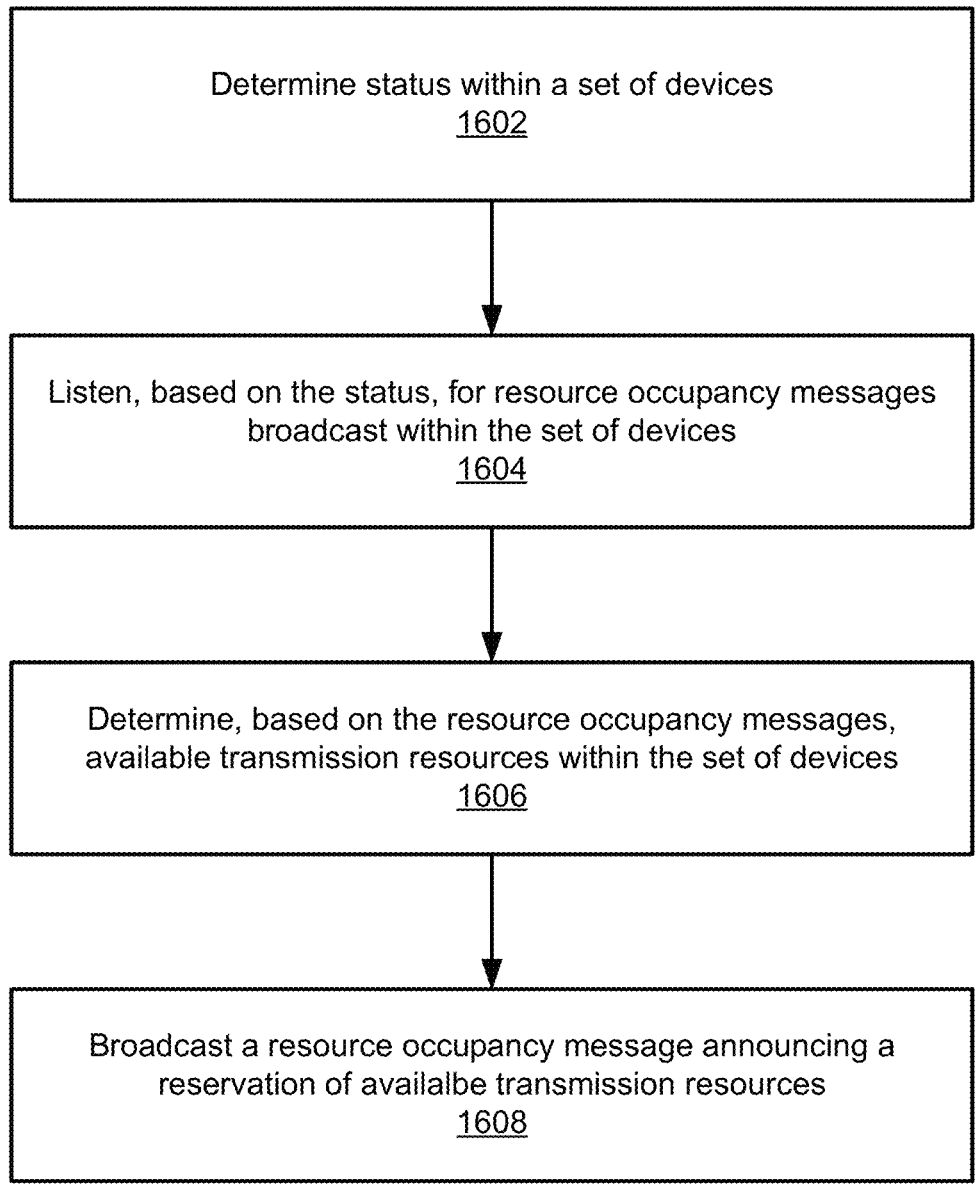
FIG. 16 illustrates a block diagram of an example of a method for autonomous (e.g., non-network assisted) side-link resource management, according to some embodiments.

FIG. 16 illustrates a block diagram of an example of a method for autonomous (e.g., non-network assisted) side-link resource management, according to some embodiments. The method shown in FIG. 16 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1602, a status of a wireless device, such as UE 106, within a set (or group) of devices (e.g., a set or group of wireless devices, such as UE 106s) may be determined (e.g., by the wireless device). In some embodiments, the status may include an expired reservation of (side-link) transmission resources and/or the wireless device being new to the set (or group) of wireless. In some embodiments, a set (or group) of devices may be defined as a set of neighboring devices within range for side-link communications with the wireless device. In some embodiments, newness (e.g., whether the wireless device is new) to the set (or group) of devices may be based (at least in part) on any of, any combination of, and/or all of a mobility condition of the wireless device, detection (by the wireless device) of entrance to a new location within a serving cell, and/or detection (by the wireless device) of a location change greater than a specified distance.

At 1604, the wireless device may listen (e.g., based on the determined status) for resource occupancy messages broadcast within the set of devices. In some embodiments, the listening may occur over (or last for) a first time period. In some embodiments, the resource occupancy messages may include a schedule of resource blocks a neighboring device (e.g., within the set of devices) will transmit in, a periodicity of resource occupancy, and a time remaining for the resource occupancy. In some embodiments, the first time period may be sufficient (e.g., of a long enough time duration) for the wireless device to receive at least one resource occupancy message from each neighboring device within the set of devices.

At 1606, the wireless device may determine, based (at least in part) on received resource occupancy messages during the first time period, available transmission resources within the set of devices. In some embodiments, the wireless device may also determine, based (at least in part) on received resource occupancy messages during the first time period, an associated duration of the available transmission resources.

At 1608, the wireless device may broadcast a first resource occupancy message announcing a reservation of available transmission resources for the associated duration. In some embodiments, the associated duration may be less than a maximum allowed channel occupancy time. In some embodiments, the first resource occupancy message may include a schedule of resource blocks the wireless device will transmit in, a periodicity of resource occupancy, and a time remaining for the resource occupancy.

In some embodiments, the wireless device may reduce, after broadcasting the first resource occupancy message, a time remaining in the associated duration. In some embodiments, the wireless device may determine that there is no time remaining in the associated duration and re-determine a status of the wireless device.

Figure 17:
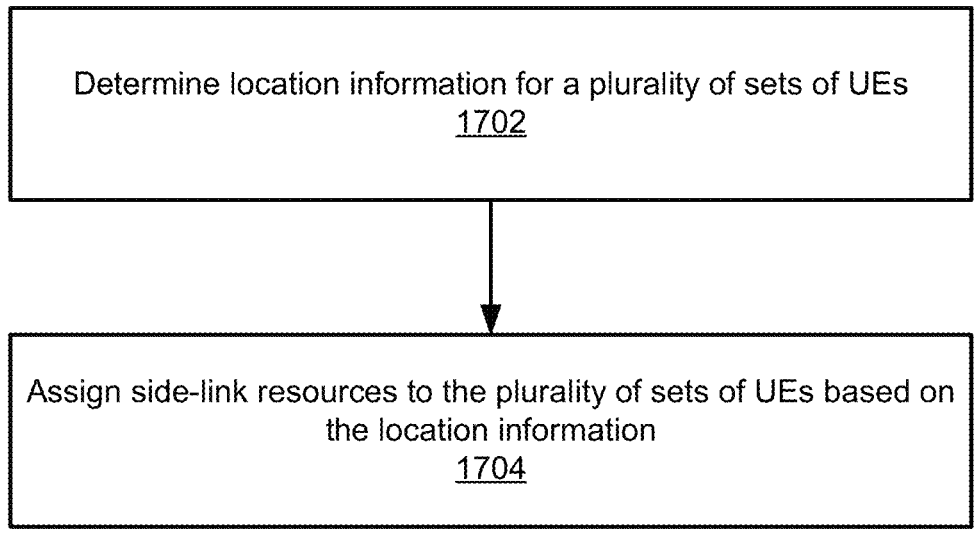
FIG. 17 illustrates a block diagram of an example of a method for non-autonomous (e.g., network assisted) side-link resource management, according to some embodiments.

FIG. 17 illustrates a block diagram of an example of a method for non-autonomous (e.g., network assisted) side-link resource management, according to some embodiments. The method shown in FIG. 17 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1702, a network node (e.g., such as eNB 602 and/or gNB 604, or more generally, base station 102), may determine location information for a plurality of sets (or groups) of devices (e.g., such as UE 106) being served by the network node. In some embodiments, a set (or group) of devices may be defined as a set of neighboring devices within range of one another for side-link communications. In some embodiments, the location information may include one or more of mobility of devices within the plurality of sets of devices and/or relative distance between the plurality of sets of devices. In some embodiments, the network node may monitor side-link communications between devices within the plurality of sets of devices and may determine location information based (at least in part) on the monitoring. In some embodiments, monitoring may include monitoring broadcast safety messages from the devices. In some embodiments, the network node may receive location updates from devices within the plurality of sets of devices and may determine location information based (at least in part) on the location updates. In some embodiments, the location updates may be periodic location updates and/or event-based location updates. In some embodiments, an event may include device position changes greater than a specified threshold and/or device transition to a new location zone. In some embodiments, a period (or periodicity) of periodic location updates may be based, at least in part, on a period (or periodicity) of periodic physical uplink shared channel (PUSCH) type 1 resource allocation configured by the network node. In some embodiments, the network node may receive, from a road side unit, a location update associated with at least one device and may determine location information for the at least one device based (at least in part) on the received location update associated with the at least one device. In some embodiments, the location update associated with at least one device may be received from the road side unit via one of a backhaul connection or a uU interface between the network node and the road side unit. In some embodiments, the network mode may request a location update from at least one device within the plurality of sets of devices and may determine location information for the at least one device based (at least in part) on the requested location update received from the at least one device. In some embodiments, the requesting may be based on expiration of a location update timer associated with the at least one device. In some embodiments, the location update timer may be reset each time location information for the at least one device is determined. In some embodiments, the network node may estimate location information for at least one device within the plurality of sets of devices based (at least in part) on beam forming angle and/or pathloss associated with the at least one device.

At 1704, the network node may assign side-link resources to the plurality of sets (or groups) of devices. The side-link resources may include time domain resources and/or frequency domain resources. In some embodiments, the assignment of the side-link resources may be based (at least in part) on the location information. In some embodiments, the assignment may include assignment of first side-link resources (e.g., time domain resources and/or frequency domain resources) to two or more sets of devices within the plurality of sets of UEs, e.g., when the two or more sets of devices may not be within side-link proximity (e.g., within range for side-link communications) of one another. In some embodiments, the assignment may include assignment of differing side-link resources (e.g., time domain resources and/or frequency domain resources) to two or more sets of devices within the plurality of sets of devices, e.g., when two or more sets of devices may be within side-link proximity of one another. In some embodiments, the assignment may include assignment of second side-link resources (e.g., time domain resources and/or frequency domain resources) to a set of devices within the plurality of sets of devices, e.g., when devices within the set of devices may reuse a side-link resource via beamforming.

Figure 18:
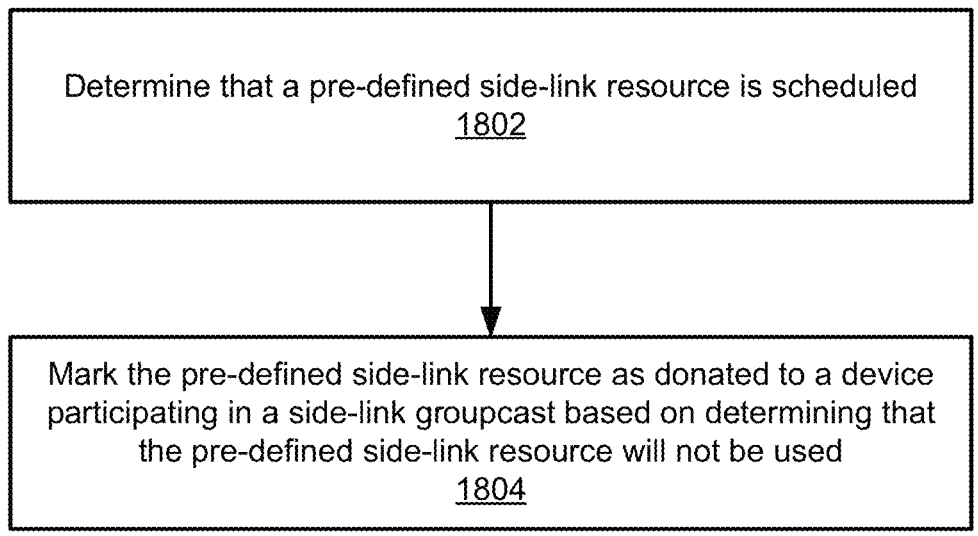
FIGS. 18-20 illustrate block diagrams of examples of methods for groupcast side-link resource management, according to some embodiments.

FIG. 18 illustrates a block diagram of an example of a method for groupcast side-link resource management, according to some embodiments. The method shown in FIG. 18 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1802, a wireless device (e.g., such as UE 106) may determine that a pre-defined side-link resource is scheduled for the wireless device. In some embodiments, prior to determining that the pre-defined side-link resource is scheduled for the wireless device, the wireless device may receive a group resource allocation from a network node (e.g., such as eNB 602 and/or gNB 604, or more generally, base station 102). In some embodiments, the group resource allocation may allocate side-link resources (e.g., time domain resources and/or frequency domain resources) to the group of wireless devices participating in a side-link groupcast. In some embodiments, prior to determining that the pre-defined side-link resource is scheduled for the wireless device, the wireless device may determine that a plurality of groups of wireless devices are competing for radio resources, sense available resources, and reserve, based at least in part on the sensed available resources, side-link resources (e.g., time domain resources and/or frequency domain resources) to the group of wireless devices participating in the side-link groupcast.

At 1804, the wireless device may mark, in response to determining that the wireless device does not have data to transmit during the pre-defined side-link resource, the pre-defined side-link resource as donated to a neighboring wireless device. In some embodiments, the wireless device and neighboring wireless device may be in a group (or set) of wireless devices participating in a side-link groupcast. In some embodiments, prior to marking the pre-defined resource as donated to the neighboring wireless device, the wireless device may receive information associated with one or more of a buffer status report, quality of service indication, and/or a data priority announcement from neighboring wireless devices participating in the side-link group cast. In such embodiments, the wireless device may determine to donate the pre-defined resource to the neighboring wireless device based on the received information.

In some embodiments, the wireless device may transmit, in response to determining that the wireless device does have data to transmit during the pre-defined side-link resource, during the pre-defined side-link resource. In such embodiments, in response to determining that the wireless device has additional data to transmit at the end of the pre-defined side-link resource, the wireless device may mark a buffer status report to indicate the additional data to neighboring wireless devices in the group of wireless devices participating in the side-link groupcast. The wireless device may receive, from at least one neighboring wireless device, a donation of pre-defined side-link resources and may transmit the additional data during the donated pre-defined side-link resources. In some embodiments, the additional data include a payload not transmitted during the pre-defined side-link resource and/or higher priority data not transmitted during pre-defined side-link resource.

Figure 19:
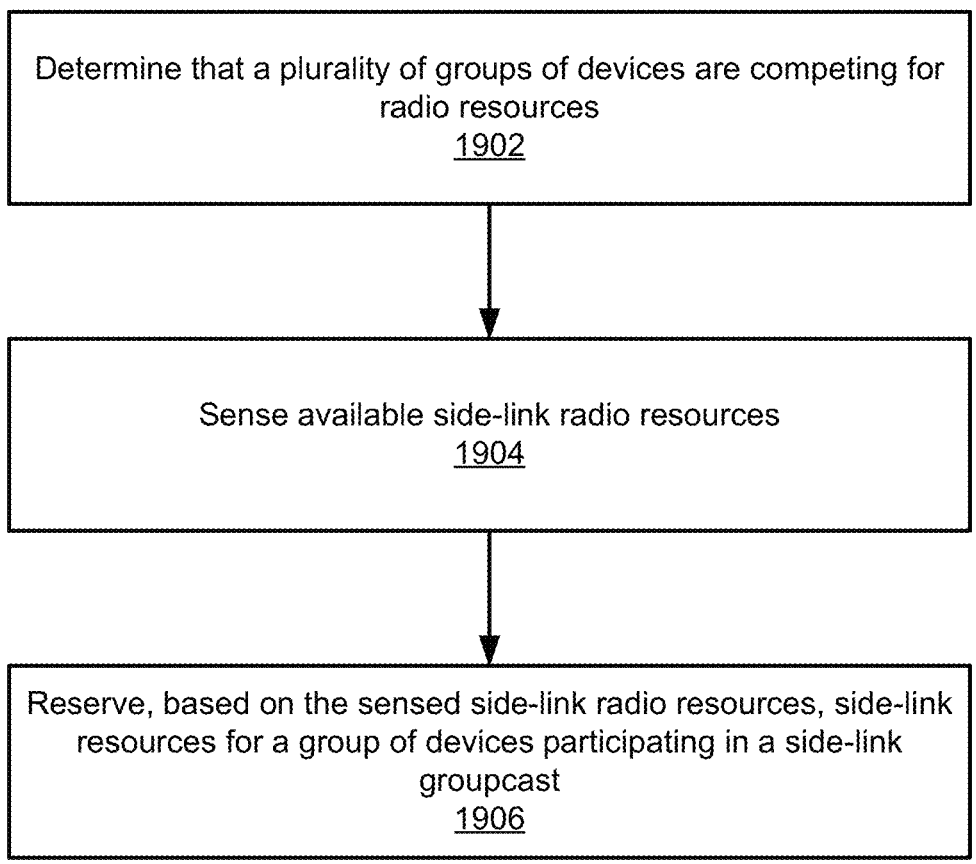

FIG. 19 illustrates a block diagram of another example of a method for groupcast side-link resource management, according to some embodiments. The method shown in FIG. 19 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1902, a wireless device (e.g., such as UE 106) may determine that a plurality of groups (or sets) of devices are competing for radio resources, e.g., for side-link communications. In some embodiments, a set (or group) of devices may be defined as a set of neighboring devices within range for side-link communications with the wireless device.

At 1904, the wireless device may sense available resources. In some embodiments, the wireless device may listen (e.g., sense) for resource occupancy messages broadcast within the groups of devices. In some embodiments, the listening may occur over (or last for) a first time period. In some embodiments, the resource occupancy messages may include a schedule of resource blocks a neighboring device (e.g., within the set of devices) will transmit in, a periodicity of resource occupancy, and a time remaining for the resource occupancy. In some embodiments, the first time period may be sufficient (e.g., of a long enough time duration) for the wireless device to receive at least one resource occupancy message from each neighboring device within the set of devices.

At 1906, the wireless device may reserve, based (at least in part) on the sensed available resources, side-link resources (e.g., time domain resources and/or frequency domain resources) to the group of wireless participating in a side-link groupcast. In some embodiments, the wireless device may broadcast a first resource occupancy message announcing a reservation of available transmission resources for the associated duration. In some embodiments, the associated duration may be less than a maximum allowed channel occupancy time. In some embodiments, the first resource occupancy message may include a schedule of resource blocks the wireless device will transmit in, a periodicity of resource occupancy, and a time remaining for the resource occupancy.

Figure 20:
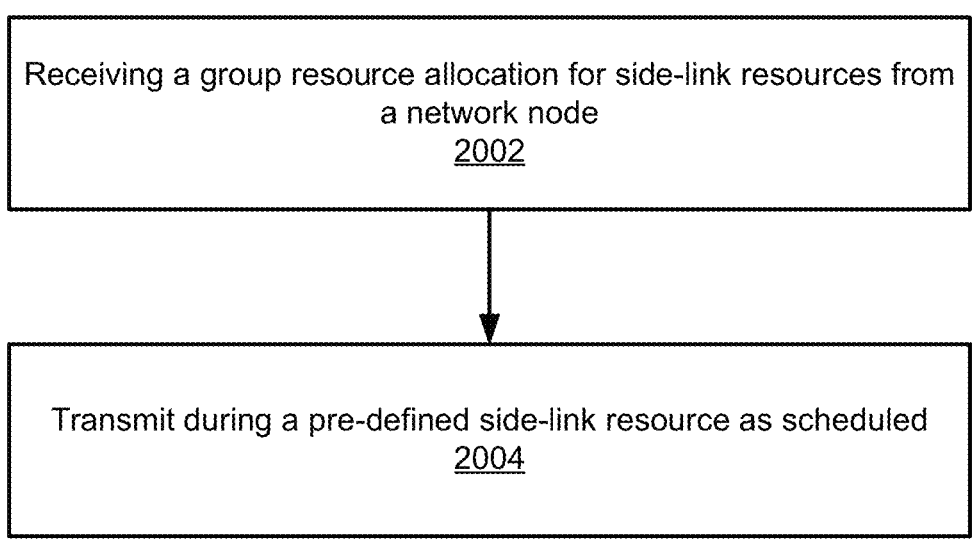

FIG. 20 illustrates a block diagram of yet another example of a method for groupcast side-link resource management, according to some embodiments. The method shown in FIG. 20 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 2002, a wireless device (e.g., such as UE 106) may receive a group resource allocation from a network node. In some embodiments, the group resource allocation may allocate side-link resources (e.g., time domain resources and/or frequency domain resources) to a group (or set) of wireless devices participating in a side-link groupcast. In some embodiments, a set (or group) of devices may be defined as a set of neighboring devices within range for side-link communications with the wireless device. In some embodiments, the group resource allocation may be based (at least in part) on the location information provided by the wireless device. In some embodiments, the location information may include one or more of mobility of the wireless device and/or relative distance between the wireless device and neighboring devices. In some embodiments, the wireless device may provide location updates to a network node via periodic location updates and/or event-based location updates. In some embodiments, an event may include device position changes greater than a specified threshold and/or device transition to a new location zone. In some embodiments, a period (or periodicity) of periodic location updates may be based, at least in part, on a period (or periodicity) of periodic physical uplink shared channel (PUSCH) type 1 resource allocation configured by the network node.

At 2004, the wireless device may transmit, during a pre-defined side-link resource scheduled for the wireless device. In some embodiments, the wireless device may mark, in response to determining that the wireless device does not have data to transmit during the pre-defined side-link resource, the pre-defined side-link resource as donated to a neighboring wireless device. In some embodiments, the wireless device and neighboring wireless device may be in a group (or set) of wireless devices participating in a side-link groupcast. In some embodiments, prior to marking the pre-defined resource as donated to the neighboring wireless device, the wireless device may receive information associated with one or more of a buffer status report, quality of service indication, and/or a data priority announcement from neighboring wireless devices participating in the side-link group cast. In such embodiments, the wireless device may determine to donate the pre-defined resource to the neighboring wireless device based on the received information.

In some embodiments, the wireless device may transmit, in response to determining that the wireless device does have data to transmit during the pre-defined side-link resource, during the pre-defined side-link resource. In such embodiments, in response to determining that the wireless device has additional data to transmit at the end of the pre-defined side-link resource, the wireless device may mark a buffer status report to indicate the additional data to neighboring wireless devices in the group of wireless devices participating in the side-link groupcast. The wireless device may receive, from at least one neighboring wireless device, a donation of pre-defined side-link resources and may transmit the additional data during the donated pre-defined side-link resources. In some embodiments, the additional data include a payload not transmitted during the pre-defined side-link resource and/or higher priority data not transmitted during pre-defined side-link resource.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   one or more processors coupled to the at least one radio, wherein the one or more processors and the at least one radio are configured to perform voice and/or data communications;
   wherein the one or more processors are configured to cause the UE to:
      determine status of the UE within a set of UEs, wherein the status includes one of an expired reservation of transmission resources or the UE being new to the set of UEs;
      listen, based on the determined status, for resource occupancy messages broadcast within the set of UEs for a first time period;
      determine, based, at least in part, on resource occupancy messages received during the first time period, available transmission resources within the set of UEs, including an associated duration of the available transmission resources; and
      broadcast a first resource occupancy message announcing a reservation of available transmission resources for the associated duration.

2. The UE of claim 1,
   wherein the set of UEs include neighboring UEs within range for side-link communications with the UE.

3. The UE of claim 1,
   wherein the one or more processors are further configured to cause the UE to determine newness to the set of UEs based, at least in part, on one of:
   a mobility condition of the UE;
   detection of entrance to a new location within a serving cell; or
   detection of a location change greater than a specified distance.

4. The UE of claim 1,
   wherein the first time period is sufficient for the UE to receive at least one resource occupancy message from each UE within the set of UEs.

5. The UE of claim 1,
   wherein the first resource occupancy message includes a schedule of resource blocks the UE will transmit in, a periodicity of resource occupancy, and a time remaining for the resource occupancy.

6. The UE of claim 1,
   wherein the associated duration is less than a maximum allowed channel occupancy time.

7. The UE of claim 1,
wherein the one or more processors are further configured to cause the UE to reduce, after broadcasting the first resource occupancy message, a time remaining in the associated duration.

8. The UE of claim 1,
wherein the one or more processors are further configured to cause the UE to:
determine that there is no time remaining in the associated duration; and
re-determine status of the UE.

9. An apparatus, comprising:
a memory; and
at least one processor in communication with the memory;
wherein the at least one processor is configured to:
listen, for a first time period, for broadcasted resource occupancy messages;
determine, based, at least in part, on resource occupancy messages received during the first time period, available transmission resources within a set of user equipment devices (UEs), wherein the resource occupancy messages include respective periodicities of resource occupancies; and
broadcast a first resource occupancy message announcing a reservation of available transmission resources including a periodicity of resource occupancy.

10. The apparatus of claim 9,
wherein the first time period is sufficient to receive at least one resource occupancy message from each UE within the set of UEs.

11. The apparatus of claim 9,
wherein the resource occupancy messages further include respective schedules of resource blocks.

12. The apparatus of claim 9,
wherein the resource occupancy messages further include a respective time remaining for a respective resource occupancy.

13. The apparatus of claim 9,
wherein the at least one processor is further configured to:
reduce, after broadcasting the first resource occupancy message, a time remaining in the available transmission resources.

14. The apparatus of claim 9,
wherein the at least one processor is further configured to determine newness to the set of UEs based, at least in part, on one of:
a mobility condition;
detection of entrance to a new location within a serving cell; or
detection of a location change greater than a specified distance.

15. A non-transitory computer readable memory medium storing program instructions executable by processing circuitry to cause a user equipment device (UE) to:
listen, for a first time period, for broadcasted resource occupancy messages;
determine, based, at least in part, on resource occupancy messages received during the first time period, available transmission resources within a set of UEs, wherein the resource occupancy messages include respective periodicities of resource occupancies; and
broadcast a first resource occupancy message announcing a reservation of available transmission resources including a periodicity of resource occupancy.

16. The non-transitory computer readable memory medium of claim 15,
wherein the first time period is sufficient to receive at least one resource occupancy message from each UE within the set of UEs.

17. The non-transitory computer readable memory medium of claim 15,
wherein the resource occupancy messages further include respective schedules of resource blocks.

18. The non-transitory computer readable memory medium of claim 15,
wherein the resource occupancy messages further include a respective time remaining for a respective resource occupancy.

19. The non-transitory computer readable memory medium of claim 15,
wherein the program instructions are further executable to:
reduce, after broadcasting the first resource occupancy message, a time remaining in the available transmission resources.

20. The non-transitory computer readable memory medium of claim 15,
wherein the program instructions are further executable to determine newness to the set of UEs based, at least in part, on one of:
a mobility condition of the UE;
detection of entrance to a new location within a serving cell; or
detection of a location change greater than a specified distance.

* * * * *